(12) United States Patent
Matsugashita

(10) Patent No.: US 8,477,341 B2
(45) Date of Patent: Jul. 2, 2013

(54) PRINTING APPARATUS AND METHOD OF CONTROLLING PRINTING

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 892 days.

(21) Appl. No.: 12/180,332

(22) Filed: Jul. 25, 2008

(65) Prior Publication Data

US 2009/0033990 A1 Feb. 5, 2009

(30) Foreign Application Priority Data

Jul. 30, 2007 (JP) ................................. 2007-197740

(51) Int. Cl.
*G06K 15/007* (2006.01)
*H04L 63/0892* (2006.01)

(52) U.S. Cl.
USPC ............ 358/1.15; 358/1.14; 358/1.13; 726/5; 726/6; 399/366

(58) Field of Classification Search
USPC ......... 358/1.14, 1.15, 1.16; 726/5, 6; 399/366
See application file for complete search history.

(56) References Cited

U.S. PATENT DOCUMENTS

| | | | | |
|---|---|---|---|---|
| 5,970,218 A | * | 10/1999 | Mullin et al. | 358/1.15 |
| 6,163,383 A | * | 12/2000 | Ota et al. | 358/1.1 |
| 6,184,996 B1 | * | 2/2001 | Gase | 358/1.15 |
| 7,515,290 B2 | * | 4/2009 | Negishi et al. | 358/1.15 |
| 7,526,555 B2 | * | 4/2009 | Shahindoust | 709/227 |
| 7,719,708 B2 | * | 5/2010 | Ferlitsch et al. | 358/1.15 |
| 7,738,124 B2 | * | 6/2010 | Ogura et al. | 358/1.14 |
| 2003/0014368 A1 | * | 1/2003 | Leurig et al. | 705/64 |
| 2003/0093670 A1 | * | 5/2003 | Matsubayashi et al. | 713/168 |
| 2004/0223175 A1 | * | 11/2004 | Lee | 358/1.13 |

FOREIGN PATENT DOCUMENTS

| | | |
|---|---|---|
| JP | 2002-036631 A | 2/2002 |
| JP | 2002-202945 A | 7/2002 |
| JP | 2005-297381 A | 10/2005 |
| JP | 2006-048209 A | 2/2006 |
| JP | 2006-190050 A | 7/2006 |
| JP | 2007105937 A | 4/2007 |

* cited by examiner

*Primary Examiner* — Dennis Dicker
(74) *Attorney, Agent, or Firm* — Canon U.S.A., Inc. IP Division

(57) ABSTRACT

A printing apparatus is configured to perform printing in accordance with a print job and in accordance with a schedule registered before the printing. The printing apparatus includes an authority setting unit configured to, if authority of a user for the print job is authorized, set the authority of the user for the print job; a determination unit configured to, if a command to handle the print job is issued by the user, determine whether the user has the authority to perform the handling based on the authority set by the authority setting unit; and an execution unit configured to, if the determination unit determines that the user has the authority, execute a process according to the handling on the print job.

11 Claims, 15 Drawing Sheets

PRINTING APPARATUS AND METHOD OF CONTROLLING PRINTING

BACKGROUND OF THE INVENTION

1. Field of the Invention

The present invention relates to a printing apparatus and a method of controlling printing, and more particularly, to a printing apparatus and a method of controlling printing which are advantageous, in particular, in handling a print job.

2. Description of the Related Art

Japanese Patent Laid-Open No. 2002-202945 discloses a technique in which when a print job is handled (i.e., when the print job is controlled in terms of deleting, advancing of priority, interrupting, etc.), the handling is permitted or is not permitted in accordance with authority granted to a user for the print job of interest. Note that the term "handle" is used throughout the present description to express controlling a print job in terms of deleting, advancing of priority, interrupting, and the like. In this technique, an access ticket included in a print job input to a device via a network or a console is compared with an access ticket of a user who wants to handle the print job, and whether the handling of the print job is permitted or not is controlled according to a result of the comparison.

Japanese Patent Laid-Open No. 2002-36631 disclosed a technique to surely delete a print job. In this technique, if a request for deleting a print job is issued by an application at a stage where the print job has not yet produced by a print device, a printing system is set such that the printing device will delete the print job. In this case, when the print job is produced, the print device deletes the print job. This makes it possible to surely delete the print job.

In a conventional printing system, when a print job is transmitted to a print device via a network, and the print job is printed by the print device, there can be a problem in terms of preventing a leak of secret information, if an output material (a printed material) is left without being taken. In this respect, there is a need for a printing system that ensures that an output material is taken by a user who performs printing. One of such printing systems is that called a pull print system. In the pull print system, a client is only allowed to upload a print job, and issuing of a print command is performed on a print device. Thus, this technique is expected to be capable of suppressing the probability that an output material is left without being taken by a user.

However, when the printing operation is controlled in the pull print system according to the technique disclosed in Japanese Patent Laid-Open No. 2002-202945, the following problems can occur. For example, when a command to delete a print job is issued, it is necessary to send the delete command via the same path as a path via which a print command was sent. However, in a large-scale server system, as in the case in a typical pull print system, the system includes a plurality of servers and is formed in a cluster configuration to distribute loads among the servers. In this configuration, it is difficult to send the command to delete a print job via the same path as the path of the print command.

In a case of conventional printing (push-printing), the same apparatus is used to produce a print job and handle the print job. Therefore, it is possible to immediately capture a print job and handle it. In contrast, in the pull print system, a print job is handled by a device different from a server that produces the print job. Therefore, it takes a long time to capture the print job, i.e., it takes a long time for the print job to reach the device. Therefore, a corresponding time is needed until the handling of the print job is reflected, and thus there is a possibility that the handling of deleting the print job is not reflected by a time by which the handling should be reflected.

Furthermore, in the technique disclosed in Japanese Patent Laid-Open No. 2002-202945, each time a handling operation is performed for a print job, checking is performed to determine whether an access ticket (authority information) embedded in the print job matches an access ticket (authority information) of a user. Therefore, in a case where authority is granted to a user in a complicated manner, for example, such that domain groups are defined, and deleting of a print job is permitted if the user is a member belonging to a particular domain group, it takes a long time to perform authentication, and thus it is necessary to wait for a long time until it is allowed to delete a print job or change the priority assigned to the print job.

Furthermore, in Japanese Patent Laid-Open No. 2002-36631, authorization as to authority to delete a print job is not considered as a technique to make it possible to surely delete a print job. Furthermore, in the technique disclosed in Japanese Patent Laid-Open No. 2002-36631, it is assumed that deleting is performed for a print job printed by a printing system. Therefore, in a case where a deleting is performed by a system different from a system used to perform printing, as is the case with the pull print system, the technique disclosed in Japanese Patent Laid-Open No. 2002-36631 cannot be applied.

SUMMARY OF THE INVENTION

In view of the above, the present invention provides a technique, in a pull print system, to efficiently handle a print job according to authority granted to an operator.

According to an aspect of the present invention, there is provided a printing apparatus configured to perform printing in accordance with a print job and in accordance with a schedule registered before the printing, including an authority setting unit configured to, if authority of a user for the print job is authorized, set the authority of the user for the print job, a determination unit configured to, if a command to handle the print job is issued by the user, determine whether the user has the authority to perform the handling, based on the authority set by the authority setting unit, and an execution unit configured to, if the determination unit determines that the user has the authority, execute a process according to the handling on the print job.

According to an aspect of the present invention, there is provided a method of controlling printing performed in accordance with a print job and in accordance with a schedule registered before the printing, comprising the steps of, if authority of a user for the print job is authorized, setting the authority of the user for the print job, if a command to handle the print job is issued by the user, determining whether the user has the authority to perform the handling, based on the authority set in the authority setting step, and, if the determination in the determination step is that the user has the authority, executing a process according to the handling on the print job.

According to an aspect of the present invention, there is provided a computer-readable storage medium storing a program configured to cause a computer to execute a process of performing printing in accordance with a print job and in accordance with a schedule registered before the printing, the process comprising the steps of, if authority of a user for the print job is authorized, setting the authority of the user for the print job, if a command to handle the print job is issued by the user, determining whether the user has the authority to perform the handling, based on the authority set in the authority setting step, and, if the determination in the determination step is that the user has the authority, executing a process according to the handling on the print job.

In the present invention, as described above, if authority of a user for a print job is authorized, the authority of the user for the print job is set. When a command to handle the print job is issued by the user, a determination is made as to whether the user has the authority to perform the handling, on the basis of the set authority. If it is determined that the user has the authority, a process according to the handling on the print job is executed depending on the authority. Thus, even in the pull print system, it becomes possible to efficiently handle the print job according to the authority granted to the user.

Further features of the present invention will become apparent from the following description of exemplary embodiments with reference to the attached drawings.

DESCRIPTION OF THE EMBODIMENTS

Embodiments of the present invention are described below with reference to the accompanying drawings.

System Configuration

Figure 1:
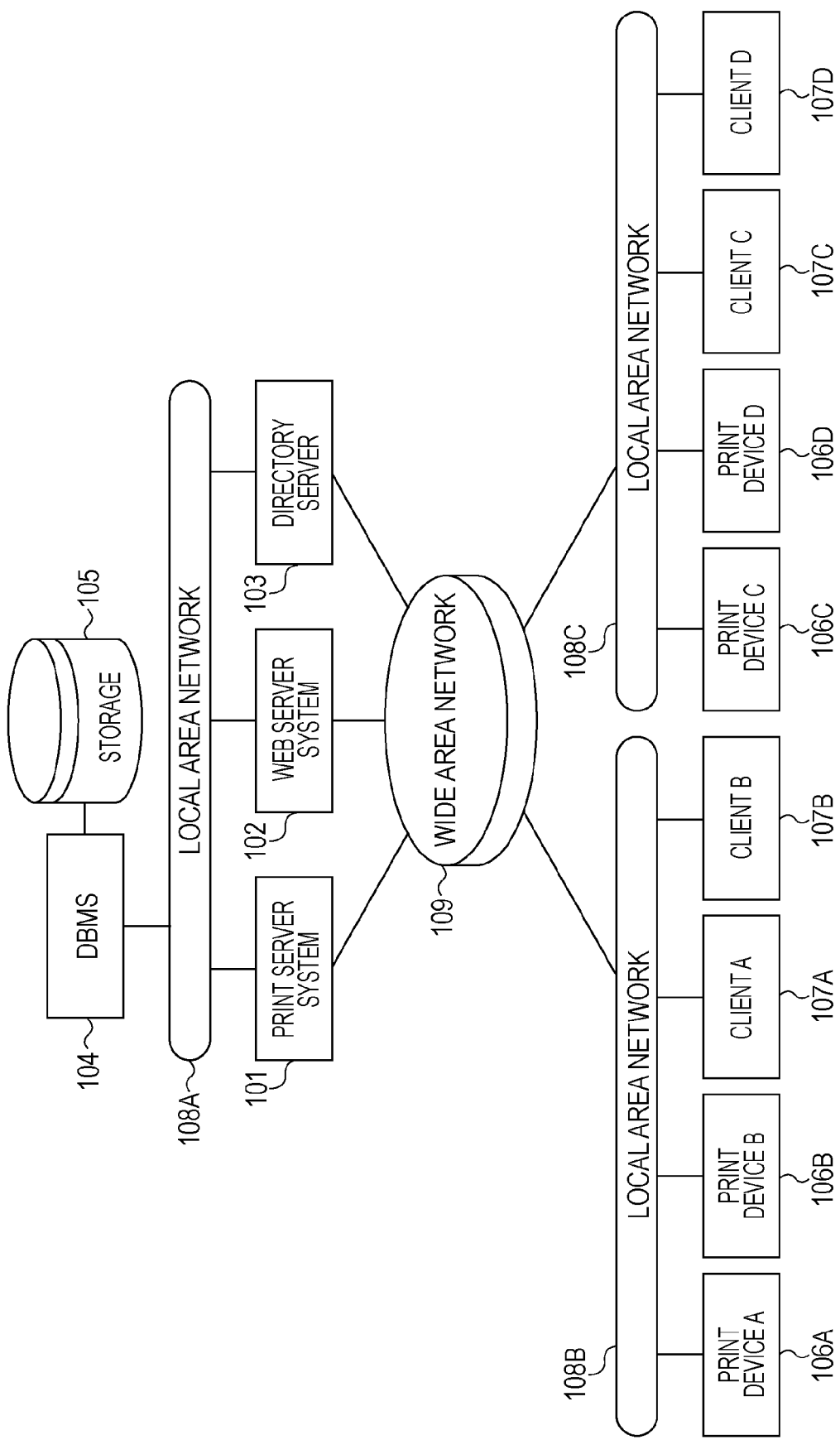
FIG. 1 is a block diagram illustrating an example of a configuration of a printing system according to an embodiment of the present invention.

FIG. 1 is a block diagram illustrating an example of a configuration of a printing system.

In this printing system, as shown in FIG. 1, a server computer system for controlling the printing system is mutually connected to a print device and a client computer via a WAN (Wide Area Network) 109.

A DBMS (DataBase Management System) 104 is a server computer system that manages data such as "document data", "print job", and "print information" stored in a storage 105. The DBMS 104 is adapted to receive an handling operation command such as updating, acquiring, adding, deleting, etc., of various kinds of data, and execute the received handling operation command. In the case of a large-scale printing system, the DBMS 104 may be formed in the cluster configuration to distribute loads, or in the cluster configuration having redundancy for handling a failure.

The storage 105 may be directly connected as a DAS (Direct Attached Storage) to the DBMS 104. Alternatively, the storage 105 may be connected as a SAN (Storage Area Network) to the DBMS 104 via a network.

The print server system 101 is a server computer system adapted to monitor or manage print devices 106 in the printing system and transfer print jobs to the print devices 106. Note that the notation "print devices 106" is used to generically denote print devices 106A to 106D. Hereinafter, the notation a "print device 106" is used to denote a typical print device when it is not necessary to discriminate between the print devices 106. In a case of a large-scale printing system, the print server system 101 may also be formed in a cluster configuration to distribute loads or may be formed in a cluster configuration with redundancy. The print server system 101 is mutually connected to the DBMS 104 or a Web server system 102, which will be described later, via a LAN (Local Area Network) 108A. The print server system 101 is adapted to transmit/receive, to/from the DBMS 104 or the Web server system 102, print job data, a print control command, information associated with a print job under management, etc.

The Web server system 102 transmits print job data managed by the print server system 101, document data managed by the DBMS 104, or the like, to front ends (clients 107) mutually connected to Web server system 102 via the WAN 109. The Web server system 102 is a server computer system in the printing system. In a case where the printing system is large in scale, the Web server system 102 is usually formed in a cluster configuration to distribute loads or formed in a cluster configuration with redundancy.

The Web server system 102 is adapted to receive a print command or a command to handle a print job from the client 107, and transfer it to the print server system 101. Furthermore, the Web server system 102 manages authentication of login from the client 107 and the print device 106, in cooperation with a directory server 103 that will be described later. The Web server system 102 has user authority information preset by a system designer or a document producer. Examples of user authority information are information associated with authority to access, print, and/or delete a document, information associated with authority to perform printing using the print device 106, information associated with authority to delete a print job, etc. The user authority information may be stored in the Web server system 102 and managed thereby, or may be stored in the DBMS 104 described above and managed thereby.

The directory server 103 is a server adapted to manage authentication of each user by using a combination of user account information (a user name) and a password. The user authentication may be managed such that each user participates in a particular domain group. In this case, for example, authority of users participating in a domain group may be set over a range different from authority individually assigned to each user. It may also be possible to make a design such that a user is allowed to participate in a plurality of domain groups.

Print devices 106A, 106B, 106C, and 106D, each used as a printing apparatus, are connected to a LAN 108B or a LAN 108C via network interface that is not shown in the figure. The LAN 108B and the LAN 108C are each connected to the WAN 109. The print device 106 is capable of communicating with the above-described print server system 101, the Web server system 102, and other apparatuses via the LAN 108B or the 108C and the WAN 109.

As for the print device 106, a laser beam printer using electrophotography, an ink-jet printer using an ink-jet technique, or other printers may be used as required. The print device 106 includes a schedule application 601 that manages a print schedule described later and a pull print application 602 that issues a print command on the print device 106. The print device 106 also includes an authentication application 603 configured to log in to the Web server system 102 in response to logging in to the print device 106. The print device 106 is connected for communication with an information input device for use to log in to the print device 106.

The clients 107A, 107B, 107C, and 107D are client computers for performing information processing. Hereinafter, these clients 107A, 107B, 107C, and 107D will be generically denoted by clients 107, and the notation a "client 107" is used to describe a typical client when it is not necessary to discriminate between the clients 107. The clients 107 are connected to the LAN 108B or the LAN 108C via a network interface that is not shown in the figure so that the clients 107 are capable of communicating with the print server system 101, the Web server system 102, or the directory server 103 via the WAN 109. The client 107 may be a computer having a permanent storage device, or a thin client having a temporary storage device.

Print Server System

Figure 2:
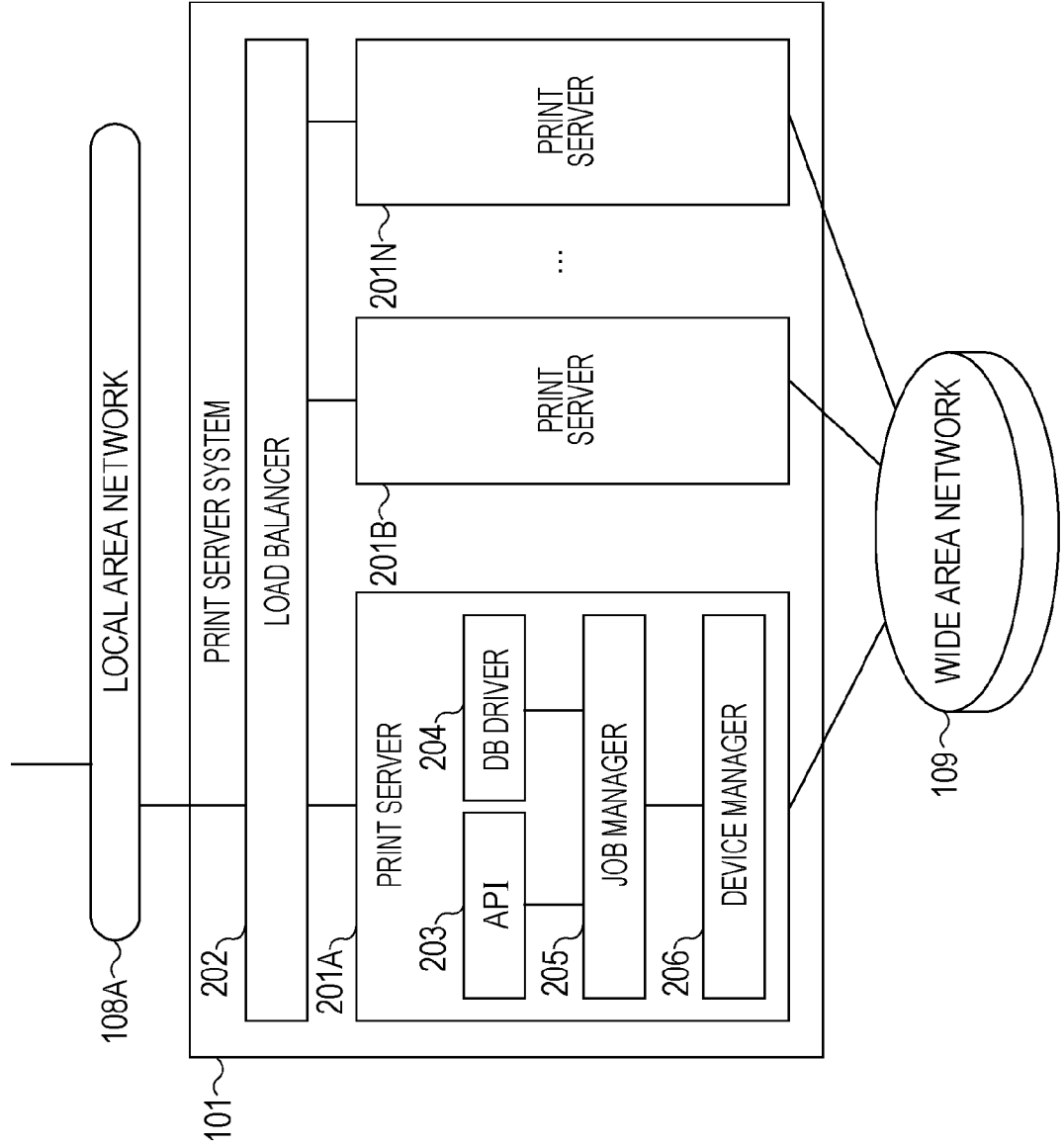
FIG. 2 is a block diagram illustrating an example of a configuration of a print server system according to an embodiment of the present invention.

FIG. 2 is a block diagram illustrating an example of a configuration of the print server system 101.

In the present embodiment, the print server system 101 is configured so as to distribute loads in a large-scale printing system. More specifically, the print server system 101 includes a plurality of print servers 201A to 201N and a load balancer 202 that is a switch mechanism for distributing loads. The plurality of print servers 201A to 201N are mutually connected to the LAN 108A via the load balancer 202. Hereinafter, these print servers 201A to 201N will be generically denoted by print servers 201, and the notation a "print server 201" is used to describe a typical print server when it is not necessary to discriminate between the print servers 201.

The load balancer 202 detects the state in terms of the load for each of the plurality of print servers 201A to 201N, and controls the distribution of loads such that a request is preferentially sent to a print server 201 on which no large load is imposed. One method of detecting the state in terms of loads is to periodically send a predetermined request to each of the print servers 201A to 201N, and determine a response time, needed for each print server 200 to return a response to the request, as the load imposed on the print server 200. Distributing of requests may be accomplished simply by sending requests in turn to the printer servers 201A to 201N. This method is called a round robin method.

The configuration of the print server 201 is explained below. The print servers 201A to 201N are similar in configuration, and thus the detailed configuration is shown in FIG. 2 only for the print server 201A, but the detailed configuration is not shown in FIG. 2 for the other print servers 201B to 201N.

As shown in FIG. 2, the print server 201 includes an API (Application Program Interface) 203, a DB driver 204, a job manager 205, and an device manager 206.

The API 203 accepts information, such as that described below, from the Web server system 102 or other servers that produce a printable document. That is, the API 203 accepts a document registration request, a document print request (print command), a print job control request (print job handling request), etc. Examples of other servers that produce a printable document include a form server adapted to produce a document in a predetermined form, a document management server adapted to centrally manage documents of users, etc.

The DB driver 204 is a module adapted to communicate with the DBMS 104. If the DB driver 204 receives, for example, a request for registering a document, the DB driver 204 registers the document in the DBMS 104. On the other hand, when the DB driver 204 receives a print request, the DB driver 204 sends a document ID indicating print data (document) to be printed to the DBMS 104 and acquires the print data (document) from the DBMS 104.

The job manager 205 has the following functions. When a document registration request is accepted by the API 203, the job manager 205 registers this document in the DBMS 104 via the DB driver 204. When a print request is accepted by the API 203, the job manager 205 acquires data associated with document data to be printed from the DBMS 104 via the DB driver 204, and manages the acquired data associated with the document as a print job.

Figure 3:
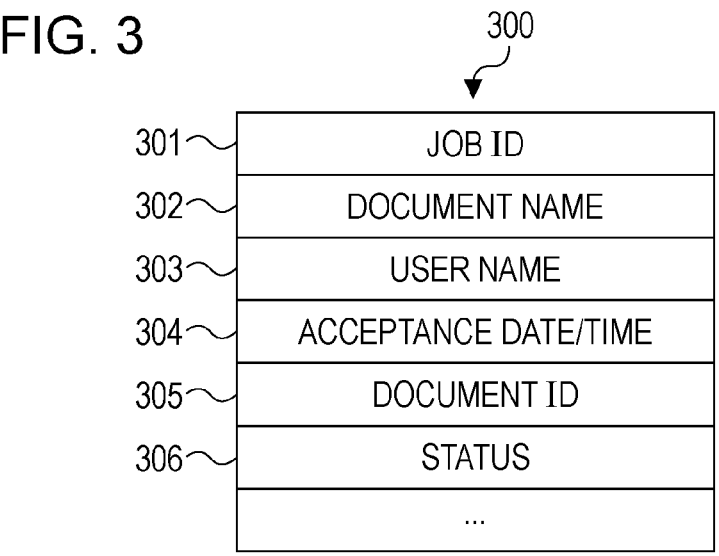
FIG. 3 is a diagram illustrating an example of information associated with a print job (job information) managed by a job manager according to an embodiment of the present invention.

FIG. 3 is a diagram illustrating an example of information of a print job (job information) managed by the job manager 205. In FIG. 3, the job information 300 includes a job ID 301, a document name 302, a user name 303, an acceptance date/time 304, a document ID 305, and a status 306. The job ID 301 is an identifier of the print job. The user name 303 is an account name of a user who has issued a print command. The document ID 305 is an identifier of a document managed by the DBMS 104. The status 306 is a status of the print job. The print job may be in one of various status, such as a "waiting for acceptance" status in which the print job is waiting for being subjected to a printing operation, a "being transferred" status in which the print job (print data) is being transferred to a print device 106, a "being printed" status in which the print job is being printed by a print device 106, etc.

The job manager 205 instructs the device manager 206 described below such that the document acquired by the DBMS 104 is printed by a print device 106 that should print this document.

Figure 4:
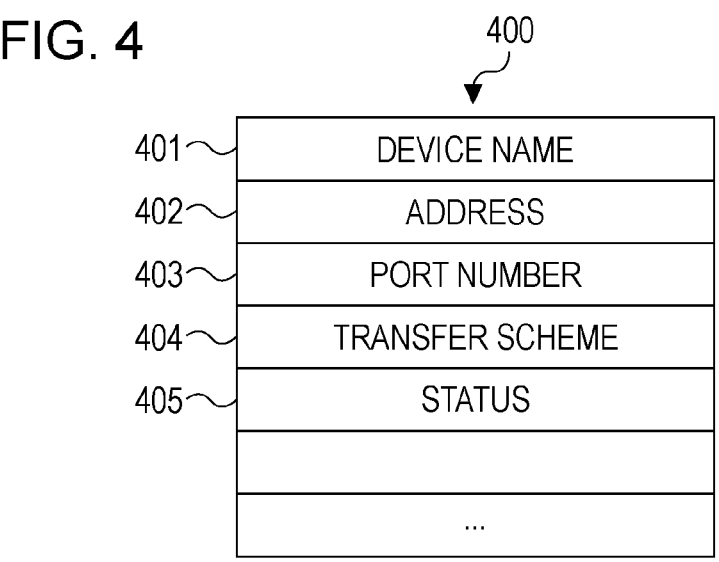
FIG. 4 is a diagram illustrating an example of information associated with a print device (device information) managed by a device manager according to an embodiment of the present invention.

Next, the device manager 206 shown in FIG. 2 is explained. FIG. 4 is a diagram illustrating an example of information (device information) associated with the a print device 106 managed by the device manager 206.

The device manager 206 manages device information 400 such as that shown in FIG. 4, and more specifically, the device manager 206 stores various kinds of information associated with the print device 106 used in the printing. The device information 400 includes a device name 401, a communication address 402 of the device, a communication port number 403, a transfer scheme 404 of the print job (print data), and a status 405 of the print device 106.

An example of the transfer scheme 404 of the print job is a RAW scheme. In this scheme, data is continuously transmitted as a stream using a TCP/IP protocol. Other examples of transfer schemes 404 of the print job include a scheme of transmitting the print job using an LPR (Line PRinter daemon protocol) protocol and that using an HTTP (Hyper Text Transfer Protocol) protocol.

The device information 400 may be managed not by the device manager 206 but by the DBMS 104. In this case, the device manager 206 acquires the device information 400 via the DB driver 204 as required. As described above, there is no particular restriction on a location where the device information 400 is stored.

If the device manager 206 accepts a request from the job manager 205 for transmitting a print job (print data), then the device manager 206 starts communicating with the schedule application 601 (see FIG. 6) provided in the print device 106. The device manager 206 then transfers (supplies) the print job to the print device 106 and instructs the print device 106 to sequentially perform printing. A method of the printing performed herein will be described in detail later.

Web Server System

The Web server system 102, which is an example of an external apparatus, is generally formed in the cluster configuration, as described above, to distribute loads. Thus, in the present embodiment, it is assumed that Web server system 102 includes a plurality of Web servers and is formed in the cluster configuration to distribute loads.

The Web server is a server adapted to perform information communication in the WWW (World Wide Web) system and is implemented by software. The Web server system 102 has the following functions. When a login occurs from a front end such as a client 107 or a print device 106, the Web server system 102 first acquires user account information (user name) and a password, and requests the directory server 103 to perform login authentication.

If the login authentication is passed successfully, then the Web server system 102 authorizes the authority of the user login user for the document. According to the authorized authority, the Web server system 102 acquires data associated with the document from the DBMS 104, and transmits the acquired data to the login client 107 or the print device 106. In this process, the Web server system 102 transmits the use ID of the login user to the DBMS 104 thereby acquiring, from the DBMS 104, the data associated with the document for which the login user has the authority.

If the Web server system 102 receives a command to print the document from the client 107 or the print device 106, the Web server system 102 sends a print command to the print server system 101 together with a document ID identifying the document.

A policy in authorizing the authority is to allow accessing to any document of any user belonging to a domain. An alternative policy is to allow accessing to only documents of the user of interest. The policy in authorizing the authority may be flexibly designed according to a policy of a user who builds the printing system. The policy in approving the authority may be set not only as to the accessing to documents but also as to the authority of printing documents, the authority of deleting print jobs, the authority of promoting, etc. In the present embodiment, the authority of the user for the print job includes authority to handle the print job (document) (handling authority (authority to handle the document itself)), and access authority (authority to perform an operation to access the document).

DBMS

The DBMS 104 may be configured to manage data using various kinds of data formats such as card type data, relational type data, an object type data, etc. In the present embodiment, by way of example, it is assumed that the DBMS 104 is configured to manage relational type of data, which is most widely employed in the art.

Figure 5:
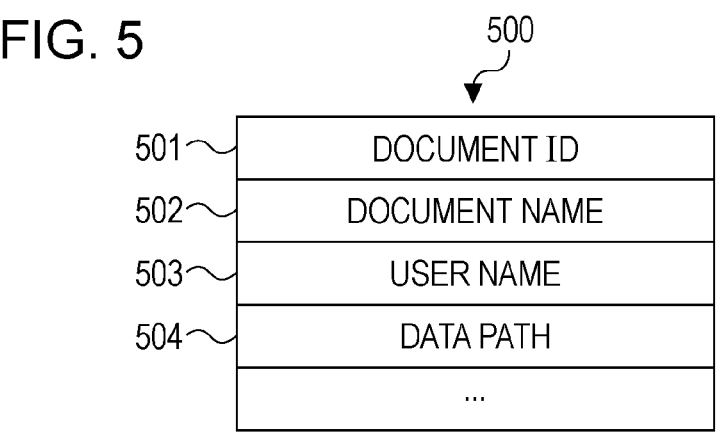
FIG. 5 is a diagram illustrating an example of information associated with a document table managed by a DBMS according to an embodiment of the present invention.

FIG. 5 is a diagram illustrating an example of a document table managed by the DBMS 104.

In FIG. 5, the DBMS 104 stores a document table 500 as table information. The information stored in the document table 500 includes information indicating a document ID 501 which is a document identifier, a document name 502, a user name 503 who has registered the document, and a data path 504 indicating a location at which the document is actually stored.

In the present embodiment, as described above, the data path 504 is stored in the document table 500 as reference information according to which to access the data associated with document, and the actual data is stored at another location. Alternatively, the data associated with the document may be directly stored in the document table 500.

The DBMS 104 is used, for example, as described below. The DBMS 104 acquires data associated with all documents of a user identical to the user name specified by the Web server system 102. Furthermore, the DBMS 104 acquires data associated with a document having an ID identical to the document ID transmitted from the print server system 101 (print server 201). The DBMS 104 registers a new document transmitted from the print server system 101 (print server 201).

Print Device

Figure 6:
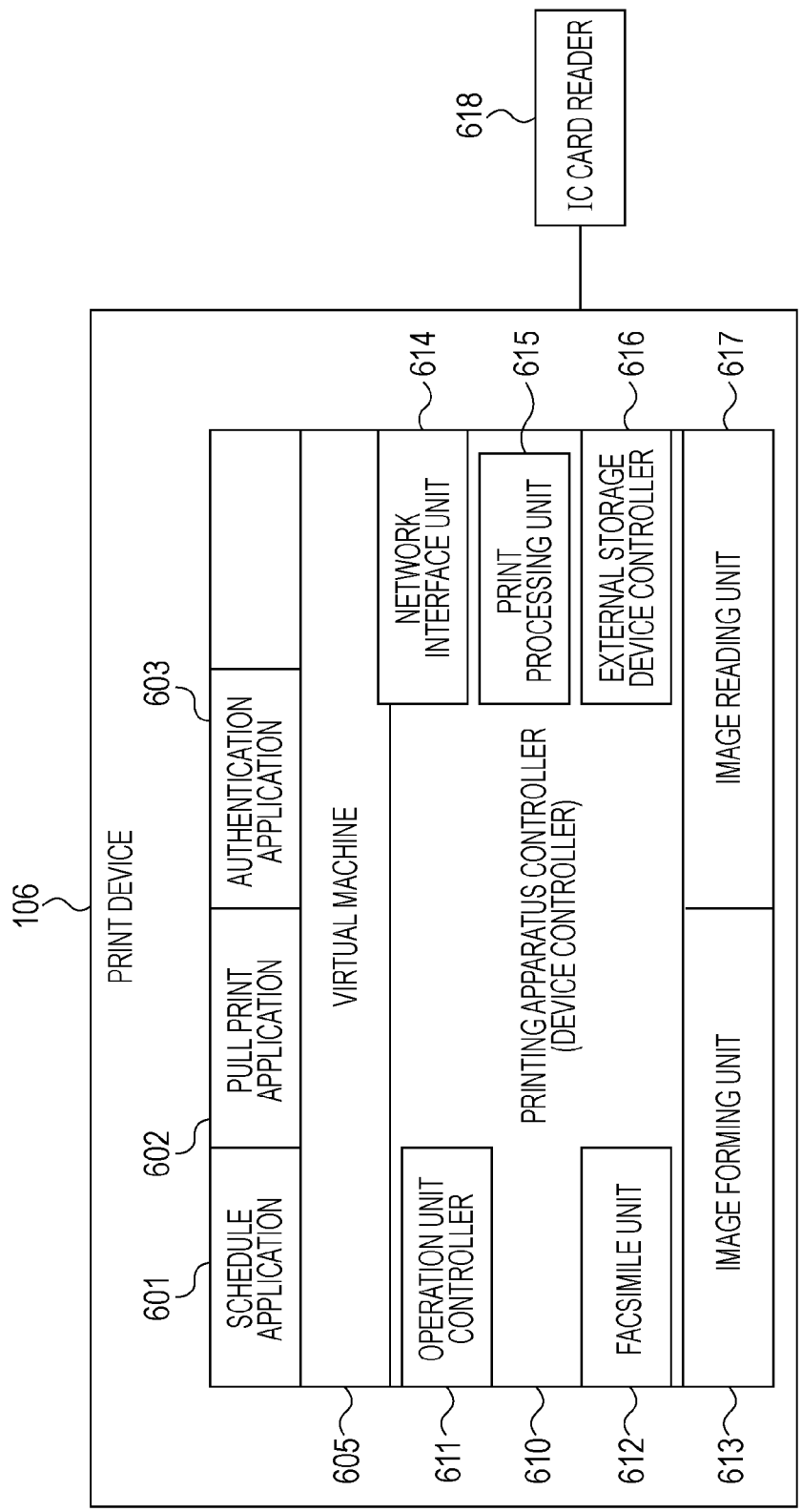
FIG. 6 is a diagram hierarchically illustrating an example of a configuration of a print device according to an embodiment of the present invention.

FIG. 6 is a diagram hierarchically illustrating an example of a configuration of a print device.

In FIG. 6, an image forming unit 613 forms an image on a recording medium such as recording paper by performing a sequence of image forming processes including handing paper, transferring an image, fixing the image, etc. This image forming unit 613 includes, for example, an ink-jet printer or an electrophotographic image forming unit.

An image reading unit 617 includes a scanner or the like, and serves to optically read an image of a document and convert it into digital image information. The image reading unit 617 outputs the digital image information to the image forming unit 613. Thus, an image is formed according to the digital image information. The image reading unit 617 transfers the digital image information to a facsimile unit 612 or a network interface unit 614. This allows the digital image information to be transmitted to the outside via a communication line.

A printing apparatus controller (device controller) 610 controls the operation of the image forming unit 613 and the operation of the image reading unit 617, for example, such that the information of the document read by the image reading unit 617 is copied by the image forming unit 613. The device controller 610, includes the network interface unit 614, the print processing unit 615, the facsimile unit 612, and the operation unit controller 611, and controls transferring information among these units.

The facsimile unit 612 transmits/receives facsimile image information. More specifically, the facsimile unit 612 transmits digital image information read by the image reading unit 617 as the facsimile image information, and the facsimile unit 612 decodes received facsimile image information. The decoded facsimile image information is recorded, by the image forming unit 613, in the form of an image on a recording medium such as recording paper.

The operation unit controller 611 generates a signal in accordance with an operation performed by a user on an operation panel of an operation unit, and displays various kinds of data or messages on the operation unit (or a display). The print processing unit 615 processes print data input, for example, via the network interface unit 614, and outputs resultant print data to the image forming unit 613 to request the image forming unit 613 to print the print data. The network interface unit 614 controls transmission/reception of data with another communication terminal device via a communication line such as the LAN 108.

A virtual machine 605 is at a level higher than the device controller 610, and the printing system is configured so that the device controller 610 can be controlled from the virtual machine 605.

The network interface unit 614 is configured such that the network interface unit 614 can be directly used by the device controller 610 and by the virtual machine 605, and such that that the device controller 610 and the virtual machine 605 can independently access to the outside via the network interface unit 614.

At a higher level than the virtual machine 605, there is an application described in a programming language having a capability of handling API (Application Programming Interface) provided by the virtual machine 605. This application is capable of indirectly interacting with the device controller 610 via the virtual machine 605, and is capable of operating the image forming unit 613 or the image reading unit 617.

In the present embodiment, the applications include a schedule application 601, a pull print application 602, an authentication application 603, and other applications 604. Any of these applications may be uninstalled or installed as a new application by the virtual machine 605.

In the present embodiment, it is assumed that the applications are installed as software in the print device 106. Alternatively, one or all of the applications may be installed as hardware. Instead of the application described above, an application installed in an external computer connected via a communication line to the print device 106 may be used.

An external storage device controller 616 is configured such that when image data read by the image reading unit 617 is converted into a data format storage in an external storage device by the image forming unit 613, external storage device controller 616 stores the image data in the external storage device. The external storage device controller 616 is also adapted to read image data stored in the external storage device. The image data read from the external storage device is subjected to a printing process performed by the image forming unit 613 or is transmitted to the outside via the network interface unit 614.

In the present embodiment, as an example of a login device used by a user to log in to the print device 106, an IC card reader 618 is connected to the print device 106 such that communication is possible between them. It is possible to supply user account information to the authentication application 603 via the IC card reader 618. The login unit may be realized by other devices. For example, an ID card reader may be used as the login unit, or a user is allowed to log in to the print device 106 by performing an inputting operation on a device panel controlled by the operation unit controller 611.

Schedule Application

Figure 7:
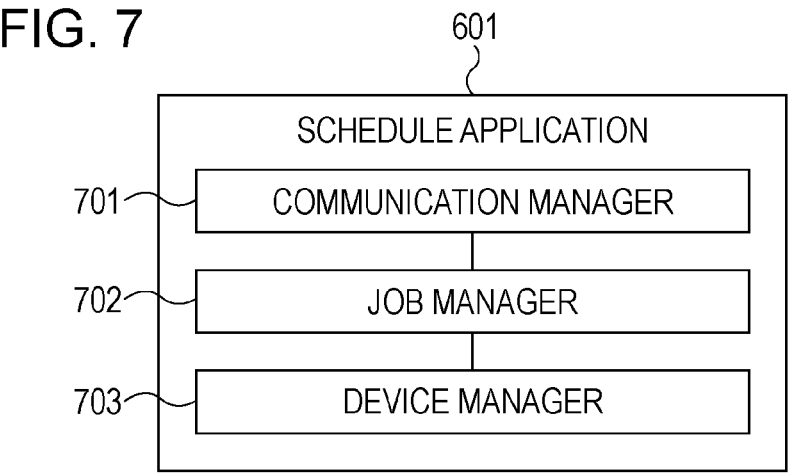
FIG. 7 is a block diagram illustrating an example of a configuration of a schedule application according to an embodiment of the present invention.

FIG. 7 is a block diagram illustrating an example of a configuration of the schedule application 601.

As shown in FIG. 7, the schedule application 601 includes a communication manager 701, a job manager 702, and a device manager 703.

The communication manager 701 receives a connection request from the print server system 101 (print server 201). The communication manager 701 is also adapted to transfer a notification of a change in the status of a print job received from the device controller 610 to the outside. The printing sequence will be described in detail later.

The job manager 702 is a module adapted to perform scheduling of a print job accepted from the print server system 101 (print server 201) and manage the print job so that the printing is performed according to the schedule. The job manager 702 is also adapted to accept a command to handle a print job, such as a command to delete the print job or a promotion command (a priority change command) from the printer server 201 or the pull print application 602 described later and control the print job according to the accepted command.

The device manager 703 is a module that communicates with the device controller 610 and serves as a driver that deletes a print job and detects a change in the status of a print job.

Figure 8:
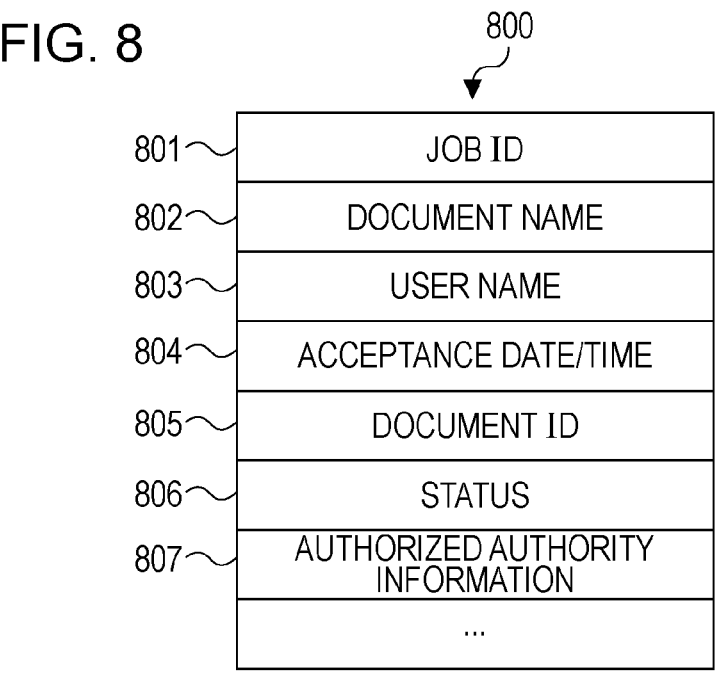
FIG. 8 is a diagram illustrating an example of schedule information indicating a schedule of a print job managed by a job manager according to an embodiment of the present invention.

FIG. 8 is a diagram illustrating an example of schedule information indicating a schedule of a print job managed by the job manager 702.

In FIG. 8, schedule information 800 includes a job ID 801 of a print job, a document name 802, a user name 803, an acceptance date/time 804, a document ID 805, a print job status 806, and authorized authority information 807 that is one of features of the present embodiment. This schedule information 800 basically includes information commonly included in the job information 300 managed by the print server system 101 (print server 201). A duplicated explanation of such common information is omitted herein (see FIG. 3).

The authorized authority information 807 includes information indicating whether or not a user logging in to the print device 106 currently has the authority to control the print job identified by the job ID 801. More specifically, for example, information indicating whether deleting of a print job is permitted, information indicating whether accessing to detailed information of the print job is permitted, information indicating whether promoting (changing of priority (processing order)) of the print job is permitted, etc. are stored as the authorized authority information 807. Acquisition and updating of the authorized authority information 807 will be explained in detail later.

Authentication Application

The authentication application 603 acquires information associated with an IC card from the IC card reader 618 that is connected to the print device 106 such that communication is possible between them, and acquires a user ID identifying a user from a user management table managed by the authentication application 603. The user management table is a 2-dimensional table in which information associated with an IC card is stored in association with a corresponding user ID.

The authentication application 603 sends the acquired user ID to the pull print application 602 described later thereby notifying the pull print application 602 of the login. The authentication application 603 is also adapted to detect a logout of a user and notify the pull print application 602 of the logout. The authentication application 603 may detect a logout, for example, by detecting pressing-down of a hard key disposed on the print device 106. When a predetermined time has elapsed without detecting any operation performed by a user, the authentication application 603 may determine that the user has logged out.

Pull Print Application

Figure 9:
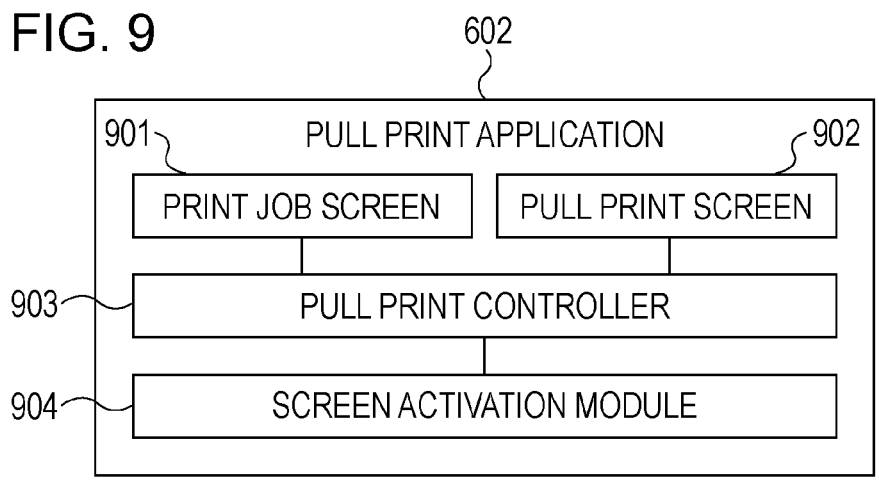
FIG. 9 is a block diagram illustrating an example of a configuration of a pull print application according to an embodiment of the present invention.

FIG. 9 is a block diagram illustrating an example of a configuration of the pull print application 602.

As shown in FIG. 9, the pull print application 602 includes a print job screen 901, a pull print screen 902, a pull print controller 903, and a screen activation module 904. The screen activation module 904 receives a login notification or a logout notification from the authentication application 603, and transfers the notification to the pull print controller 903. If the pull print controller 903 receives the login notification, the pull print controller 903 initializes or newly produces the print job screen 901 and the pull print screen 902. A more detailed explanation of the print job screen 901 and the pull print screen 902 will be given later. When the pull print controller 903 receives a logout notification, the pull print controller 903 discards the produced print job screen 901 and pull print screen 902.

Next, a processing flow associated with printing and that associated with handling of a print job are described below.

Print Sequence

Figure 10:
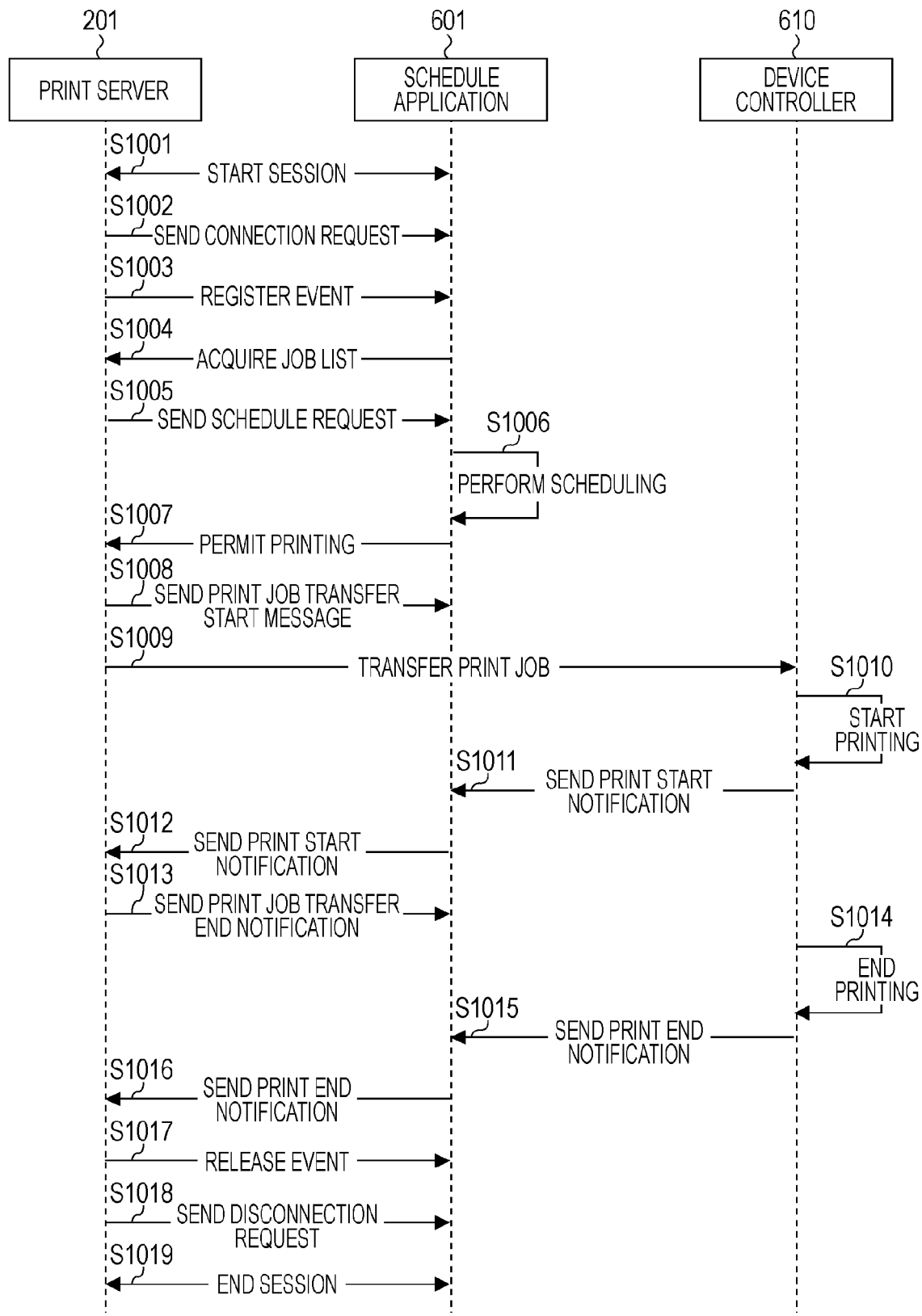
FIG. 10 is a diagram illustrating an example of a print sequence performed between a print server system (print server) and a print device (a schedule application and a device controller) according to an embodiment of the present invention.

First, referring to FIG. 10, an explanation is provided as to an example of a print sequence performed between the print server system 101 (print server 201) and the print device 106 (schedule application 601 and device controller 610).

Note that, although not shown in the figure, when the schedule application 601 is started, schedule application 601 performs an event registration in the device controller 610 so that when a change in status occurs in the print job of the print device managed by the device controller 610, the change is notified to the schedule application 601.

A document print request sent to the print server 201 includes a document ID and a name or an address of the print device 106 to be used in printing. In accordance with the notified document ID, the job manager 205 acquires data associated with the document from the DBMS 104 via the DB driver 204. Next, the device manager 206 identifies the print device 106 to be used in printing. Thereafter, printing is performed according to the sequence described below.

First in step S1001, the print server 201 and the schedule application 601 establish a communication session. The establishment of the communication session is accomplished by using a communication protocol such as TCP/IP or HTTP.

Next, in step S1002, the print server 201 sends a connection request to the schedule application 601. The schedule application 601 accepts this connection request by the communication manager 701.

Next, in step S1003, the print server 201 registers an event notification request in the schedule application 601 so that a notification is provided to the print server 201 when the status of the print job or the print device 106 changes.

Next, in step S1004, the print server 201 acquires a list of schedule information 800 currently managed by the job manager 702 of the schedule application 601. This list of schedule information 800 may be sent to another application server connected to, for example, the print server 201. Alternatively, the list of schedule information 800 may be sent to a console for managing the print server 201. It is possible to realize a function of provide information associated with a print job to the client 107 via the Web server system 102. However, such a function is not related to the present invention, a further detailed description thereof is omitted herein.

Next, in step S1005, the print server 201 issues a schedule request as to the print job to the schedule application 601. Note that the schedule request includes job information 300.

Next, in step S1006, on receiving the schedule request, the schedule application 601 adds information based on the schedule request to the schedule information 800 managed by the job manager 702. The schedule application 601 then issues a new job ID and registers it. This job ID is notified to the print server 201.

Next, in step S1007, the job manager 702 controls a printing order in accordance with the order of the list of the schedule information 800. When a print job in the schedule information 800 is given to a turn, the job manager 702 issues a print permission command to a print server 201 that has registered this print job. The printing order may be controlled simply in accordance with the order registered in the list of the schedule information 800, or in accordance with the priority set in the print job.

If the print server 201 receives the print permission command, then, in step S1008, the print server 20 sends a print job transfer start notification to the schedule application 601. Thereafter, in step S1009, the print server 201 starts transferring the print job to the device controller 610. The transferring of the print job is performed according to the transfer scheme 404 set in the device information 400 shown in FIG. 4. If the schedule application 601 receives the print job transfer start notification, the schedule application 601 changes the status 806 of the schedule information 800 associated with this print job into the "being transferred" status.

Next, in step S1010, the device controller 610 sequentially analyzes the print job received from the print server 201, and starts printing.

Next, in step S1011, to change the status of the print job under management into the "being printed" status, the device controller 610 sends a notification of the change in the status to "print started" to the schedule application 601 that has registered the event notification request. That is, the device controller 610 notifies the schedule application 601 that printing has started.

If the schedule application 601 receives this notification via the device manager 703, then, in step S1012, the schedule application 601 sends a print start notification to the print server 201 that has registered the event notification request. Thus the print server 201 is capable of recognizing the status of the print job the print command for which has been issued by the print server 201.

If the print server 201 completes the transfer of the print job, then, in step S1013, the print server 201 notifies the schedule application 601 that the transfer of the print job has been completed. If the schedule application 601 receives this notification, then, as at the time at which transferring of the print job was started, the schedule application 601 changes the status 806, into "transfer completed", of the schedule information 800 of the print job that has been transferred.

Thereafter, in step S1014, the print device 106 ends the printing operation. If the printing is completed in the above-described manner, then in step S1015, the device controller 610 notifies the schedule application 601 that the printing is completed, as at the time at which the printing was started. If the schedule application 601 receives this notification, then in step S1016, the schedule application 601 sends a print end notification to the print server 201.

When the print server 201 receives this notification, if all print jobs to be processed have been completed, then in step S1017, the print server 201 releases registration of the event notification request in the schedule application 601. Next, in step S1018, the print server 201 sends a disconnection request to the schedule application 601. If the registration of the event notification request is released and if the disconnection request arrives at the schedule application 601, the schedule application 601 performs a process of ending the communication with the print server 201.

Finally, in step S1019, the print server 201 and the schedule application 601 close (release) the session established in step S1001.

Thus, the print server 201 is capable of performing printing using the print device 106 via the schedule application 601, in the above-described manner.

Print Job Screen Handling Sequence

Next, referring to FIG. 11 and FIG. 12, the print job screen 901 on the pull print application 602 is explained below.

Figure 11:
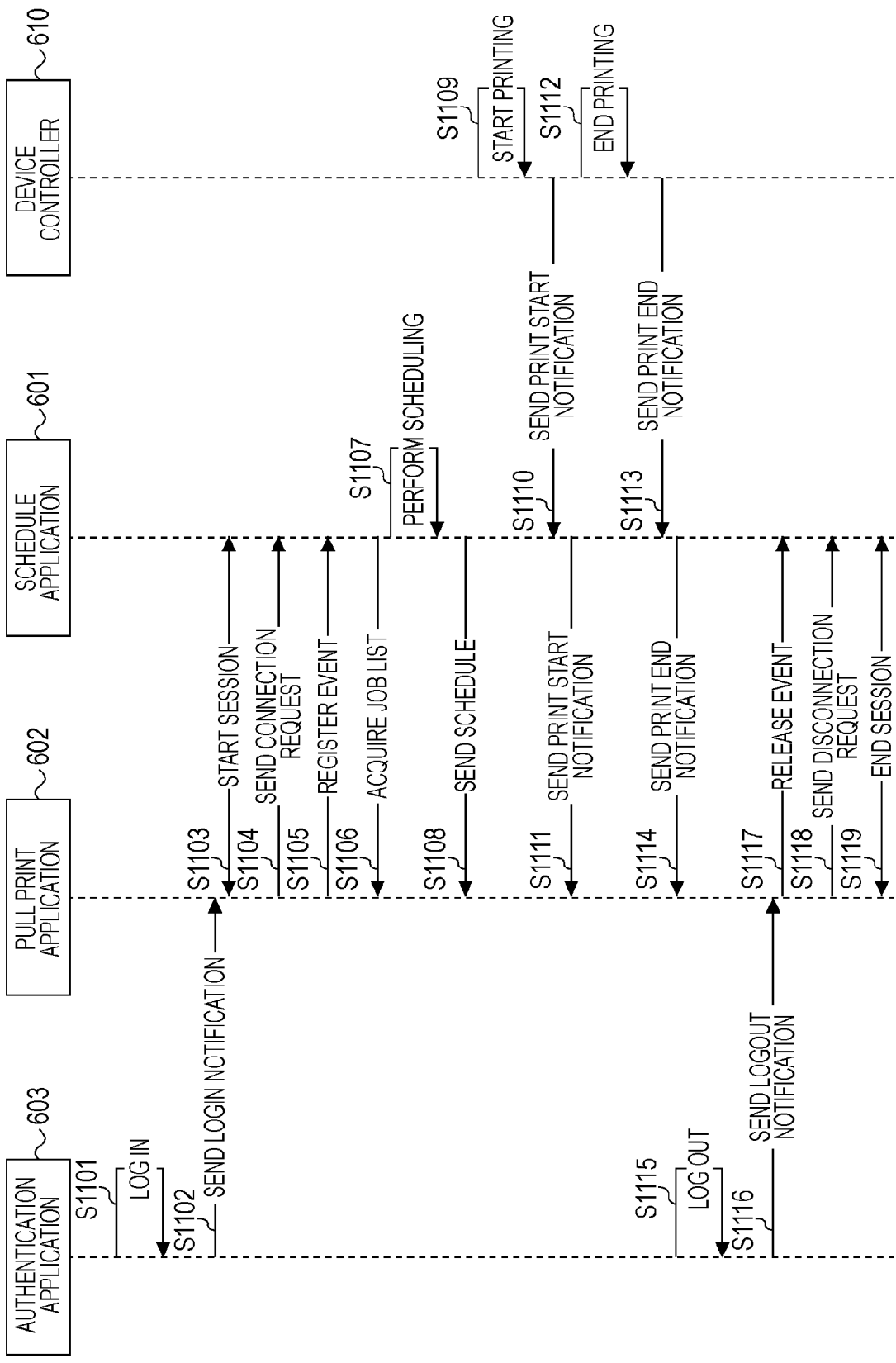
FIG. 11 is a diagram illustrating an example of a sequence performed in producing items displayed on a print job screen according to an embodiment of the present invention.
Figure 12:
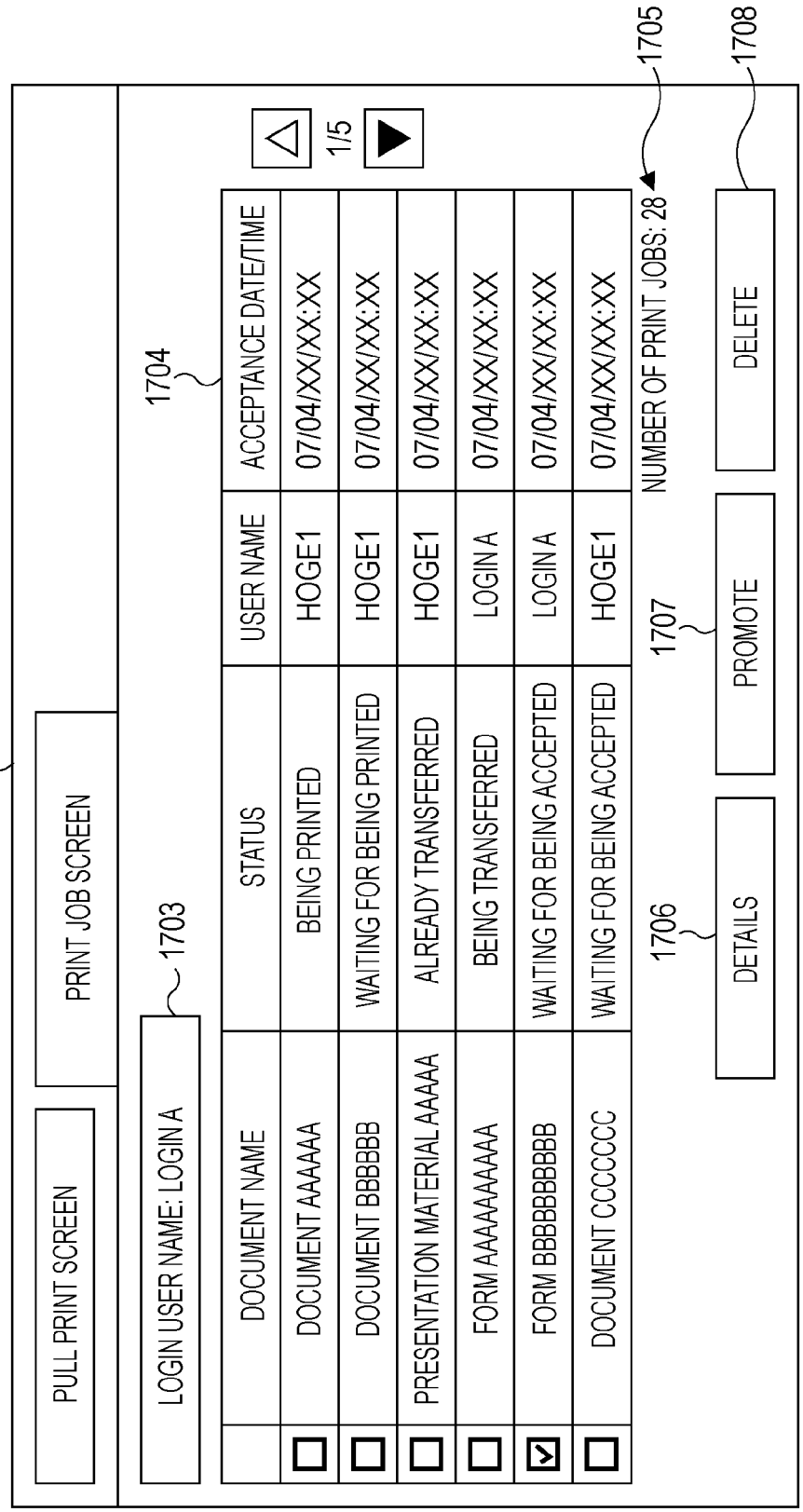
FIG. 12 is a diagram illustrating an example of a print job screen according to an embodiment of the present invention.

FIG. 11 is a diagram illustrating an example of a sequence in producing items displayed on the print job screen 901. FIG. 12 is a diagram illustrating an example of the print job screen 901.

First, if, in step S1101 shown in FIG. 11, the authentication application 603 receives a login of a user from the IC card reader 618, then in step S1102, the authentication application 603 acquires user account information (user ID) associated with the user who has performed the login. The authentication application 603 sends a login notification to the pull print application 602.

If the pull print application 602 receives the login via the screen activation module 904, the pull print application 602 produces the print job screen 901. In this process, the pull print application 602 displays a user name according to the acquired user account information (the user ID) in a login user name field 1703 of the print job screen 901.

Next, in step S1103, the pull print application 602 establishes a communication session between the schedule application 601. The establishment of the communication session is accomplished by using a communication protocol such as TCP/IP or HTTP. Note that this communication is performed in the virtual machine 605 by using a method called loop back, and thus data transmitted in the communication does not go to the outside.

Next, in step S1104, the pull print application 602 sends a connection request to the schedule application 601. The schedule application 601 receives this connection request via the communication manager 701.

Next, in step S1105, the pull print application 602 registers an event notification request in the schedule application 601 so as to receive a notification when the status of the print job changes.

Next, in step S1106, the pull print application 602 acquires a list of schedule information 800 currently managed by the job manager 702 of the schedule application 601.

If the pull print application 602 acquires the list of the schedule information 800, the pull print application 602 displays the content of the acquired list in a print job list field 1704 of the print job screen 901. In this process, the total number of acquired lists (print jobs) is displayed in a number-of-print-jobs field 1705. In a case where the total number of records included in the acquired list (the total number of print jobs) is too great to display the entire contents of the acquired list (print jobs) in the print job list field 1704 at a time, the pull print application 602 performs a paging process as shown in FIG. 12. Note that in the example shown in FIG. 12, the print job lists 1704 are described over 5 pages.

Next, in step S1107, the schedule application 601 newly performs scheduling of print jobs, for example, in accordance with a command given by the print server 201. In this case, in step S1108, the schedule application 601 sends a schedule to the pull print application 602. Upon receiving the schedule, the pull print application 602 appends new job information at the end of the print job list 1704 thereby updating the print job screen 901.

In a case where printing is started or ended as is the case in step S1109, S1110, S1112, or S1113, the status of the print job is updated as described below. For example, if the schedule application 601 receives a print start notification or a print end notification, the schedule application 601 sends a notification of the change in the status of the print job to the pull print application 602 from which the event notification request has been registered (step S1111 or S1114). Upon receiving the notification of the change in the status of the print job, the pull print application 602 updates the status of this print job in the print job list 1704 on the print job screen 901.

If the details button 1706 on the print job screen 901 is operated by a user so as to be pressed, then the pull print application 602 displays, on another screen, detailed information associated with print jobs checked in the print job list 1704.

Thereafter, in step S1115, if the authentication application 603 detects a logout performed by the user, for example, by pressing a hard key, then in step S1116, the authentication application 603 sends a notification of the logout of the user to the pull print application 602. Upon receiving this notification, the pull print application 602 releases the registration of the event notification request in the schedule application 601, and then the pull print application 602 sends a disconnection request to the schedule application 601 (steps S1117 and S1118). Finally, the pull print application 602 closes the session with the schedule application 601 (step S1119).

A process performed when a promote button (priority change button) 1707 on the print job screen 901 is pressed, and a process performed when a delete button 1708 is pressed will be described later.

The pull print application 602 produces the print job screen 901 in the above-described manner.

Pull Print Screen Handling Sequence

Next, referring to FIG. 13 and FIG. 14, a pull print screen 902 on the pull print application 602 is described below.

Figure 13:
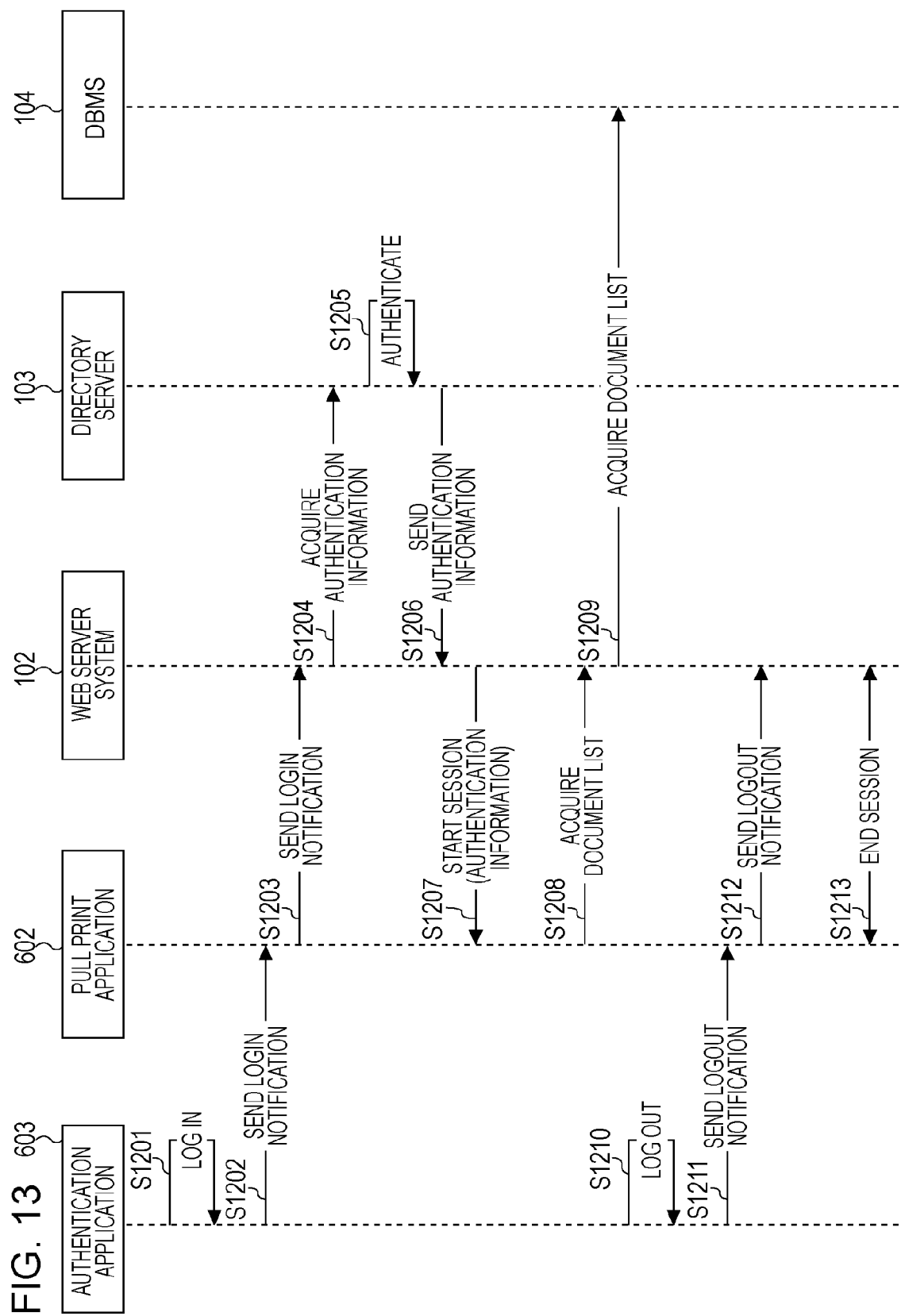
FIG. 13 is a diagram illustrating an example of a sequence performed in producing items displayed on a pull print screen according to an embodiment of the present invention.

FIG. 13 is a diagram illustrating an example of a sequence performed in producing items displayed on the pull print screen 902. FIG. 14 is a diagram illustrating an example of the pull print screen 902.

First, if, in step S1201 of FIG. 13, the authentication application 603 receives a login of a user from the IC card reader 618, then in step S1202, the authentication application 603 acquires user account information (user ID) associated with the login user. The authentication application 603 sends a login notification to the pull print application 602.

The pull print application 602 accepts the login via the screen activation module 904, and produces a pull print screen 902. In this process, the pull print application 602 displays a user name according to the acquired user account information (user ID) in a login user name field 1803 of the pull print screen 902.

Next, in step S1203, the pull print application 602 sends a login notification to the Web server system 102. In this process, the user account information (user ID) acquired from the authentication application 603 is used as information for the login. To achieve improved security, in addition to the user account information (user ID), a password may be used. In this case, the authentication application 603 may internally manage each pair of a password and user ID or may perform authentication using a password by communicating with the external directory server 103. Alternatively, instead of using the IC card reader 618 in performing login, the login may be performed by inputting the user ID of the password via a screen.

If the Web server system 102 receives the login notification from the pull print application 602, then in step S1204, the Web server system 102 requests the directory server 103 to provide authentication information.

Next, in step S1205, the directory server 103 performs authentication using pre-registered user information. If the authentication is successful, then in step S1206, the directory server 103 returns, as the authentication information, user information and information indicating a domain group to which the user belongs, to the Web server system 102. On the other hand, if the authentication fails, the directory server 103 returns a message indicating the authentication failure to the Web server system 102. In this case, the login fails.

If the Web server system 102 receives the authentication information from the directory server 103, then in step S1207, the Web server system 102 sends a communication session start notification to the pull print application 602. In this process, together with the notification, the authentication information acquired in step S1206 is also transferred to the pull print application 602.

Next, in step S1208, on the basis of the acquired authentication information, the pull print application 602 requests the Web server system 102 to provide a list of documents. In this step, a narrowing condition may be set, for example, such that only a list of documents registered by a user ID is requested or such that a list of all documents of a domain group to which the user belongs to is requested. In the present embodiment, by way of example, it is assumed that the list of documents registered by the user ID is requested.

If the Web server system 102 receives the request for acquisition of the document list, then in step S1209, the Web server system 102 acquires the list of documents with IDs identical to the user ID from the DBMS 104, and transfers the acquired list to the pull print application 602.

If the pull print application 602 acquires the list of documents, the pull print application 602 displays the list in the document list field 1804 of the pull print screen 902. In this process, the pull print application 602 also displays the total number of acquired documents in the number-of-documents field 1805. In a case where the total number of records in the acquired list (the total number of documents) is too great to display the entire contents of the acquired list (documents) in the document list field 1804 of the pull print screen 902 at a time, the pull print application 602 performs a paging process. In the example shown in FIG. 14, the contents of the acquired list (documents) are displayed in the document list field 1804 of the pull print screen 902 for all documents at a time (on one page).

If the details button 1806 on the pull print screen 902 is operated by a user so as to be pressed, then the pull print application 602 displays, on another screen, detailed information associated with documents checked in the document list 1804 In a case where the delete button 1807 on the pull print screen 902 is operated by a user so as to be pressed, then the pull print application 602 requests the Web server system 102 to delete the documents. If the Web server system 102 receives the document delete request, the Web server system 102 deletes the documents requested to be deleted, of the documents managed by the DBMS 104.

In step S1210, if the authentication application 603 detects a logout performed by the user, for example, by pressing a hard key, then in step S1211, the authentication application 603 sends a notification of the logout of the user to the pull print application 602. If the pull print application 602 receives this notification, then in step S1212, the pull print application 602 sends a notification of the logout to the Web server system 102. Finally, in step S1213, the pull print application 602 closes the session with the Web server system 102.

A process performed when a print button 1808 is pressed on the pull print screen 902 will be described later.

The pull print application 602 produces the pull print screen 902 in the manner described above.

Pull Print Sequence

Figure 15:
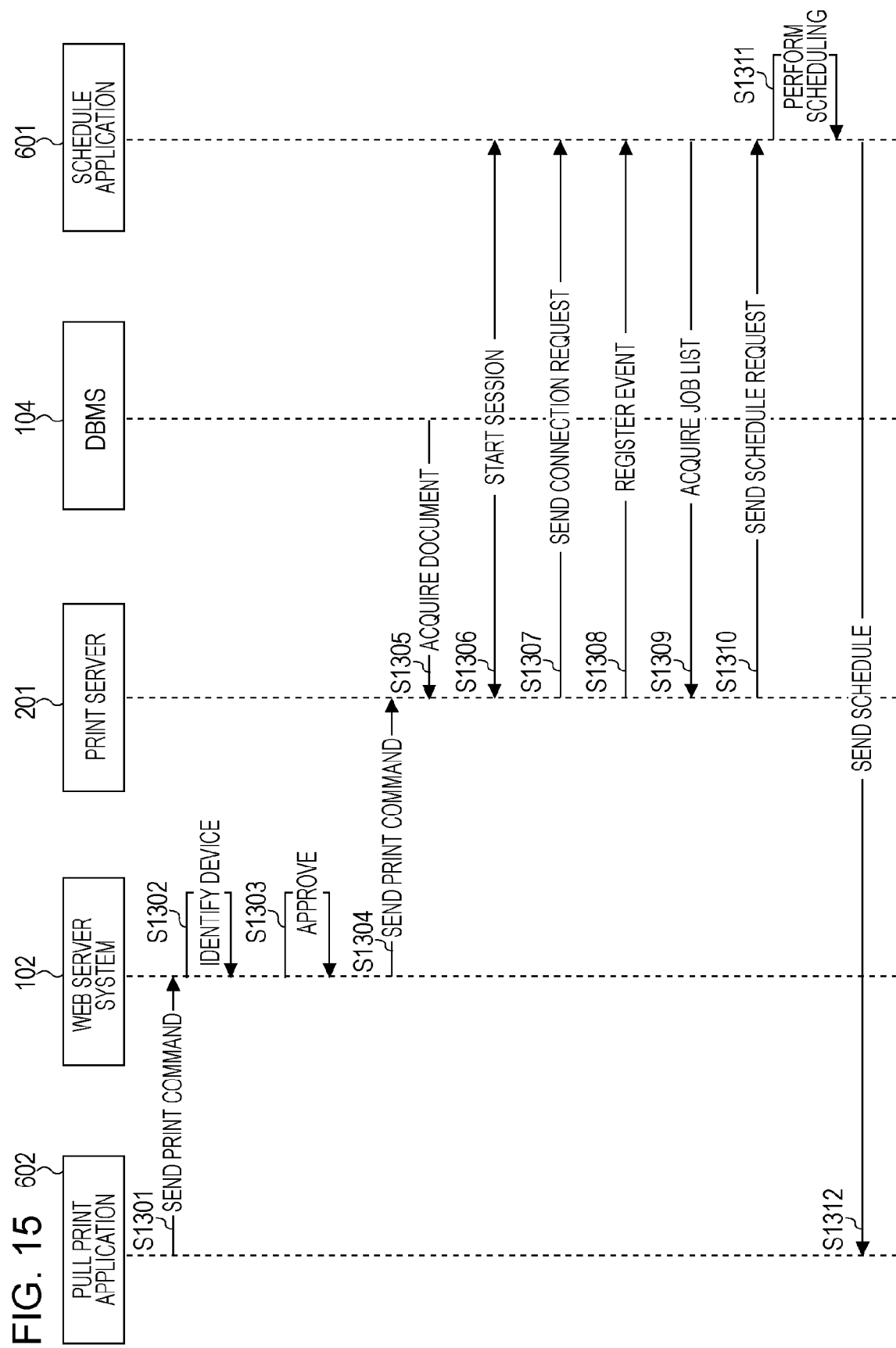
FIG. 15 is a diagram illustrating an example of a sequence performed when a print button is pressed on a pull print screen according to an embodiment of the present invention.

Next, referring to FIG. 15, a description is given of an example of a sequence performed when the print button 1808 on the pull print screen 902 is pressed.

If the print button 1808 is pressed, the pull print application 602 acquires a document ID identifying a document checked in the document list 1804 of pull print screen 902. In step S1301, the pull print application 602 sends a print command to the Web server system 102. The print command includes the acquired document ID, and information associated with the print device 106 in which the pull print application 602 is installed. Examples of the information associated with the print device 106 include an address of the print device 106 and a device type.

Next, in step S1302, the Web server system 102 identifies the print device 106. In this identification step, the Web server system 102 identifies the print device 106 from the device information 400 managed by the DBMS 104 or the print server 201, in accordance with the information associated with the print device 106 transmitted in step S1301.

Next, in step S1303, the Web server system 102 performs authorization as to whether the user who has issued the print command has the authority for printing of the document specified by the user. If the authorization fails, the Web server system 102 notifies the pull print application 602 that the printing is not permitted.

On the other hand, if the authorization is passed successfully, then in step S1304, the Web server system 102, sends a print command to the print server 201. This print command includes the device information 400 associated with the print device 106 identified in step S1302 and the document ID transmitted in step S1301.

If the print server 201 receives the print command, then in step S1305, the print server 201 acquires, from the DBMS 104, a document corresponding to the document ID included in the print command.

Thereafter, printing is performed according to the sequence described above with reference to FIG. 10 (steps S1305 to S1311).

The information associated with the schedule registered in step S1311 by the schedule application 601 is sent, in step S1312, from the schedule application 601 to the pull print application 602. If the pull print application 602 receives this information, the pull print application 602 updates the contents of the print job list 1704 on the print job screen 901 in accordance with the received information.

Thus, the pull printing is performed using the pull print screen 902 in the manner described above.

Authorization Sequence

Next, an explanation is provided below as to authorize the authority to handle a print job registered in the print job list 1704 on the print job screen 901.

The authorization as to authority for handling a print job can be realized by adding an authorization sequence to the sequence of producing the print job screen 901 described above with reference to FIG. 11. The realization of the authorization sequence may be based on one of two methods described below. In the following explanation, it is assumed that in the sequence of producing the print job screen 901 described above with reference to FIG. 11, the process of logging in to the pull print application 602 in steps S1101 and S1102 has already been performed.

First Example of Authorization Sequence

First, referring to FIG. 16, an explanation is provided below as to a first example of a sequence of authorizing the authority to handle a print job registered in the print job list 1704 of the print job screen 901.

First, in step S1401, the pull print application 602 establishes a communication session with the schedule application 601. The establishment of the communication session is accomplished by using a communication protocol such as TCP/IP or HTTP. Note that this communication is performed in the virtual machine 605 by using a method called loop back, and thus data transmitted in the communication does not go to the outside.

Next, in step S1402, the pull print application 602 sends a connection request to the schedule application 601. The schedule application 601 accepts this connection request via the communication manager 701.

Next, in step S1403, the pull print application 602 registers an event notification request in the schedule application 601 so that a notification will be provided to the pull print application 602 when a change occurs in the status of the print job.

Next, in step S1404, the pull print application 602 acquires a list of schedule information 800 currently managed by the job manager 702 of the schedule application 601. The pull print application 602 stores the acquired list as a print job list 1704.

Next, in step S1405, the pull print application 602 requests the Web server system 102 to approve the print job of the schedule information 800 acquired in step S1404. The requesting for the authorization is performed by sending information associated with a user logging in to the pull print application 602 and a document ID of the print job or an print job ID to the Web server system 102.

In this process, the authorization may be requested for all print jobs or for particular print jobs satisfying a particular condition.

For example, the particular condition may be that the status of print job indicates that the transfer of the print job has been started or the print job is in a status following that. That is, print jobs for which the authorization is requested may be limited to those in a particular status, such as those which are being transferred, those which have been transferred, or those which are being printed. For a print job that has not yet been transferred, even if authorization is performed after a print job delete command is issued, the deleting command is executed because it takes a time to start printing.

Another example of the condition is that print jobs having an owner name identical to the user name logging in. This condition is based on the policy that any print job requested to be quickly deleted must be of the owner.

As described above, print jobs to be subjected to the authorization of the authority can be determined by comparing information set to print jobs, such as the status or the user name of print jobs, with the information indicating the preset condition.

Alternatively, the condition may be set in terms of the number of print jobs. For example, print jobs within a particular range of the printing order from the first position to a predetermined number-th position (for example, print jobs within a range from the first place to a predetermined number-th place in the registration order in which the schedule information 800 was registered) may be subjected to the authorization process. For example, in a case where the print job list 1704 is described over a plurality of pages, authorization may be performed for all print jobs included in the first and second pages. If it is detected that a user has advanced the page, authorization may be performed for print jobs described on the third page.

In the present embodiment, as described above, the authorization request unit is realized by executing the process in step S1405.

If the Web server system 102 receives the authorization request, the Web server system 102 authorizing the authority of the user logging in to the pull print application 602 for the print job of interest in accordance with the preset policy. Examples of authority are authority to delete a print job, authority to promote the priority of the print job, and authority to access detailed information of the print job. The Web server system 102 returns the authorized authority information 807 indicating the authorized authority to the pull print application 602.

Next, in step S1406, the pull print application 602 sets the acquired authorized authority information 807 in the schedule information 800 managed by the schedule application 601. In the present embodiment, as described above, the authority setting unit is realized by executing the process in step S1406.

Figure 17:
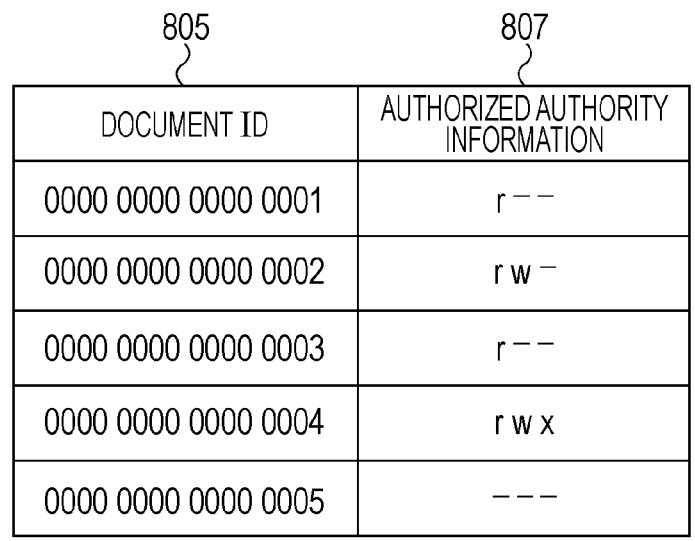
FIG. 17 is a diagram illustrating an example of authorized user authority information according to an embodiment of the present invention.

FIG. 17 is a diagram illustrating an example of authorized user authority information 807. As described above, the authorized authority information 807 is included in the schedule information 800 managed by the schedule application 601 (job manager 702), and stored in association with the document ID 805. In FIG. 17, for simplicity, the schedule information 800 such as acceptance date/time 804 is not shown.

In FIG. 17, "r" in the authorized authority information 807 indicates that the user has the authority for the detailed information of the print job. "w" indicates that the user has the authority to delete the print job, and "x" indicates that it is allowed to advance the priority such that printing is performed ahead of other print jobs. For example, a user currently logging in to the pull print application 602 does not have any authority for a print job with a document ID of "0000 0000 0000 0005", but has the authority in terms of all handling operations, i.e., deleting, accessing to detailed information, and advancing the priority, for a print job with a document ID of "0000 0000 0000 0004".

The authorized authority information 807 may be related to the job ID 801.

Referring again to FIG. 16, if a schedule of a new print job occurs in step S1407, then in step S1408, the schedule application 601 notifies the pull print application 602 of the schedule.

If the pull print application 602 receives the notification of the schedule, then in step S1409, requesting for authorization for a print job which has newly occurred is performed in a similar manner to step S1405. In step S1410, the pull print application 602 sets the acquired authorized authority information 807 in the schedule application 601 in a similar manner to step S1406. In the present embodiment, as described above, the authorization request unit is realized by executing the process in step S1409, and the authority setting unit is realized by executing the process in step S1410.

Instead of performing authorization for a print job which has newly occurred, authorization may be performed for a print job whose transfer has been started. The authorized authority information 807 associated with the print job should be set according to the authorization method in steps S1405 and S1406 described above. For example, when the authorization is performed according to the paging of the print job list 1704, the authorization process in steps S1405 and S1409 is performed in response to detecting advancing of the page performed by a user.

If a logout from the pull print application 602 occurs, then in step S1411, the pull print application 602 releases the registration of the event notification request in the schedule application 601. Thereafter, in step S1412, the pull print application 602 requests the schedule application 601 to delete the authorized authority information 807. In response, the schedule application 601 deletes the authorized authority information 807.

In step S1413, the pull print application 602 sends a disconnection request to the schedule application 601. In step S1414, the pull print application 602 closes the communication session with the schedule application 601.

The schedule application 601 sets and deletes the authorized authority information 807 included in the schedule information 800 the schedule application 601 manages, in the manner described above. Thus, the print job can be processed in accordance with the authority indicated by the authorized authority information 807.

Second Example of Authorization Sequence

Figure 18:
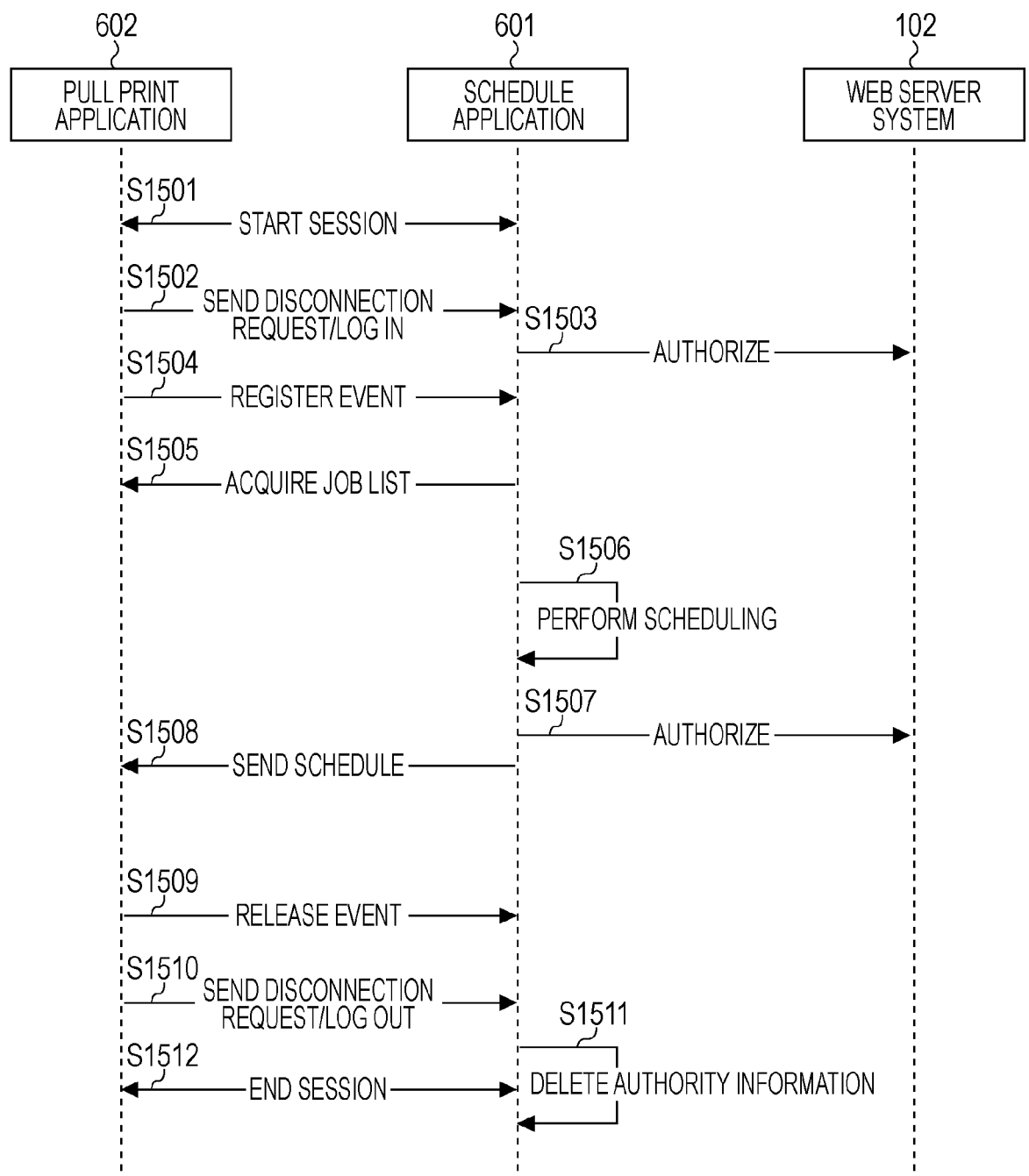
FIG. 18 is a diagram illustrating a second sequence performed in authorizing the authority to handle a print job registered in a print job list on a print job screen according to an embodiment of the present invention.

Next, referring to FIG. 18, an explanation is provided below as to a second example of a sequence of authorizing the authority to handle a print job registered in the print job list 1704 of the print job screen 901.

First, in step S1501, the pull print application 602 establishes a communication session with the schedule application 601. The establishment of the communication session is accomplished by using a communication protocol such as TCP/IP or HTTP Note that this communication is performed in the virtual machine 605 by using a method called loop back, and thus data transmitted in the communication does not go to the outside.

Next, in step S1502, the pull print application 602 sends a connection request to the schedule application 601, that is, the pull print application 602 logs in to the schedule application 601. In this login process, the pull print application 602 sends user account information (a user ID) to the schedule application 601. The schedule application 601 accepts the login via the communication manager 701.

If the schedule application 601 accepts the login, then in step S1503, the schedule application 601 requests the Web server system 102 to authorize the authority for the print job of the currently stored schedule information 800. The requesting for the authorization is performed by sending the information associated with the login accepted in S1502 (the user account information (the use ID)) and a document ID of the print job to the Web server system 102.

Figure 16:
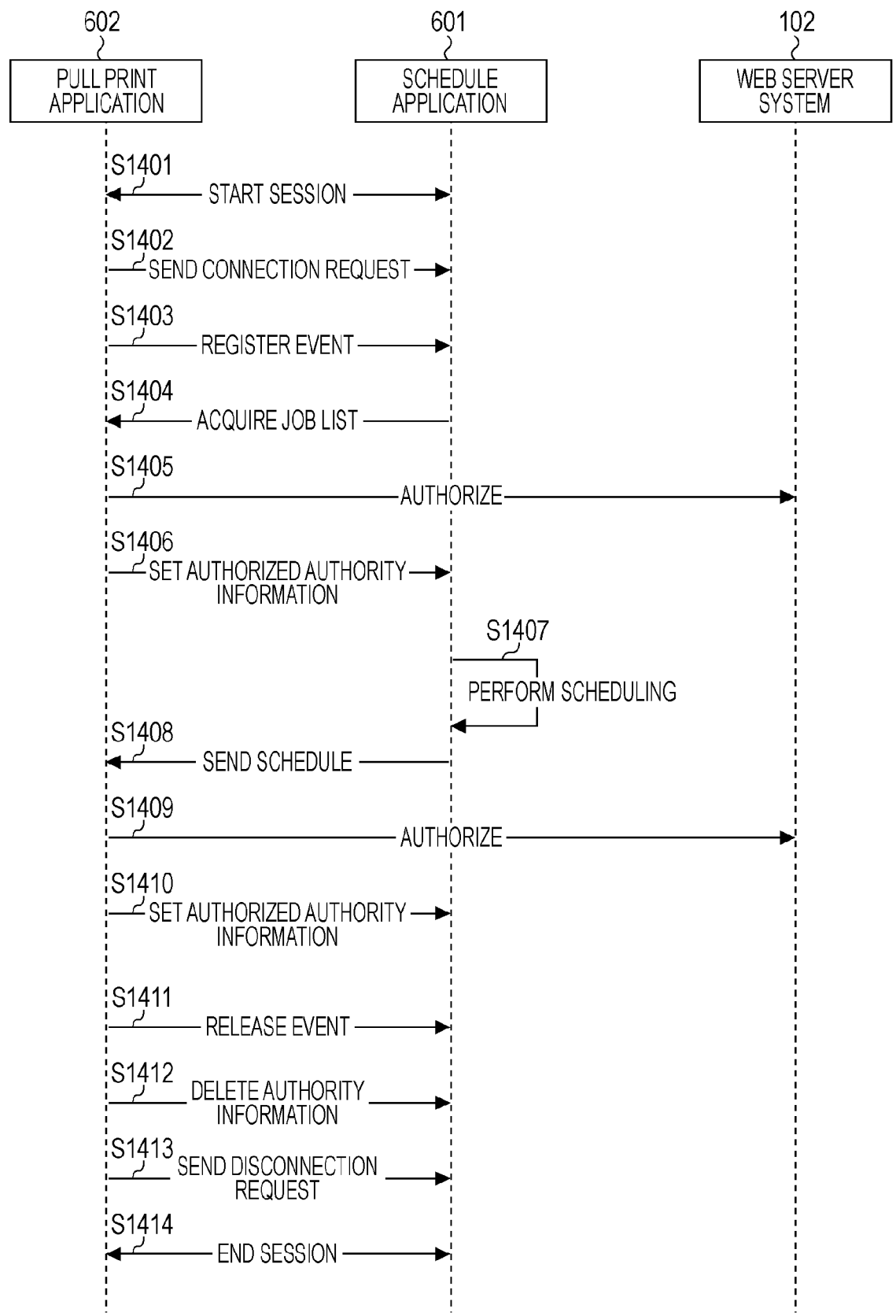
FIG. 16 is a diagram illustrating a first sequence performed in authorizing authority to handle a print job registered in a print job list on a print job screen according to an embodiment of the present invention.

The authorization is performed in a similar manner to step S1405 in FIG. 16. The print jobs to be subjected to the authorization process are selected in a similar manner as described above with reference to step S1405 in FIG. 16. That is, if the Web server system 102 receives the authorization request, the Web server system 102 authorizes the authority of the user logging in to the pull print application 602 for the print job of interest in accordance with the preset policy. The Web server system 102 returns the authorized authority information 807 indicating the authorized authority to the pull print application 602.

Figure 14:
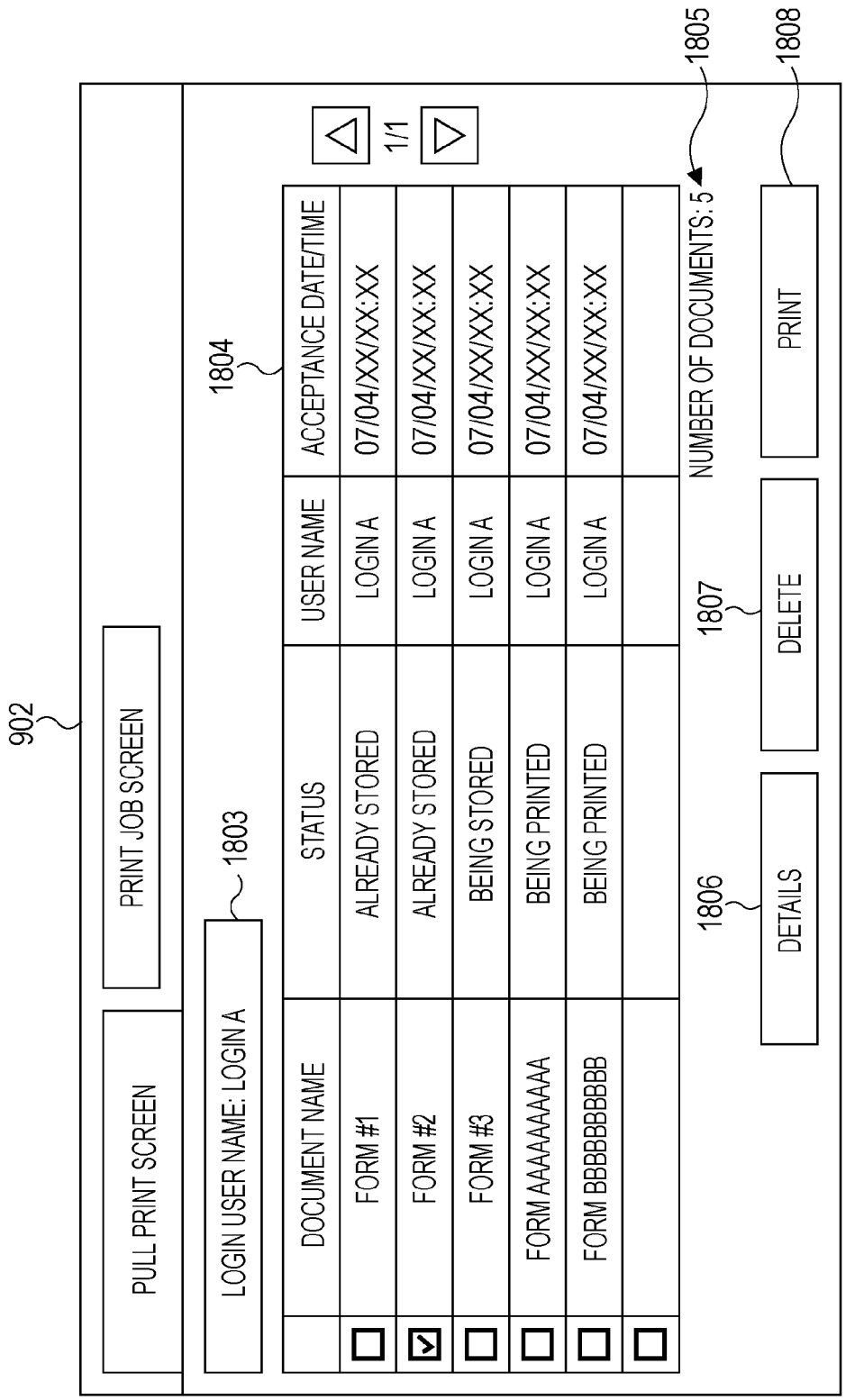
FIG. 14 is a diagram illustrating an example of a pull print screen according to an embodiment of the present invention.

After the authorization is completed in the above-described manner, the schedule application 601 sets the authorized authority information 807 transmitted from the Web server system 102 in the schedule information 800 stored in the schedule application 601, in a similar manner to step S1406 in FIG. 14.

In the present embodiment, as described above, the authorization request unit and the authority setting unit are realized by executing the process in step S1503.

Next, in step S1504, the pull print application 602 registers an event notification request in the schedule application 601 so that a notification will be provided to the pull print application 602 when a change occurs in the status of the print job.

Next, in step S1505, the pull print application 602 acquires a list of schedule information 800 currently managed by the job manager 702 of the schedule application 601. The pull print application 602 stores the acquired list as a print job list 1704.

If a schedule of a new print job occurs in step S1506, then in step S1408, the schedule application 601 issues a request for authorization for a print job which has newly occurred, in a similar manner to step S1503. The schedule application 601 then sets the authorized authority information 807 transmitted from the Web server system 102 in the schedule information 800 stored in the schedule application 601, in a similar manner as to step S1503. In the present embodiment, as described above, the authorization request unit and the authority setting unit are realized by executing the process in step S1507.

Instead of authorizing the authority for a print job which has newly occurred, authorization may be performed for a print job whose transfer has been started. The authorized authority information 807 associated with the print job should be set according to the authorization method in step S1503 described above. For example, when the authorization is performed according to the paging of the print job list 1704, the authorization process in steps S1503 and S1507 is performed in response to detecting advancing of the page performed by a user.

In step S1508, the schedule application 601 notifies the pull print application 602 of the schedule.

If a logout from the pull print application 602 occurs, then in step S1509, the pull print application 602 releases the registration of the event notification request in the schedule application 601. In step S1510, the pull print application 602 sends a disconnection request to the schedule application 601, that is, the pull print application 602 sends a logout notification to the schedule application 601.

If the schedule application 601 receives the logout notification, then In step S1511, the schedule application 601 deletes all authorized authority information 807 registered in the schedule information 800 stored in the schedule application 601. In the present embodiment, as described above, the deleting unit is realized by executing the process in step S1511.

In step S1512, the pull print application 602 closes the communication session with the schedule application 601.

As described above, in response to the login or logout of the user to/from the pull print application 602, the schedule application 601 sets or deletes the authorized authority information 807 in/from the schedule information 800 the schedule application 601 manages. Thus, the print job can be processed in accordance with the authority indicated by the authorized authority information 807.

Print Job Handling Sequence

Next, referring to FIG. 19, an explanation is provided below as to an example of a sequence performed when the promote button 1707 on the print job screen 901 is pressed, and as to an example of a sequence performed when the delete button 1708 is pressed.

Figure 19:
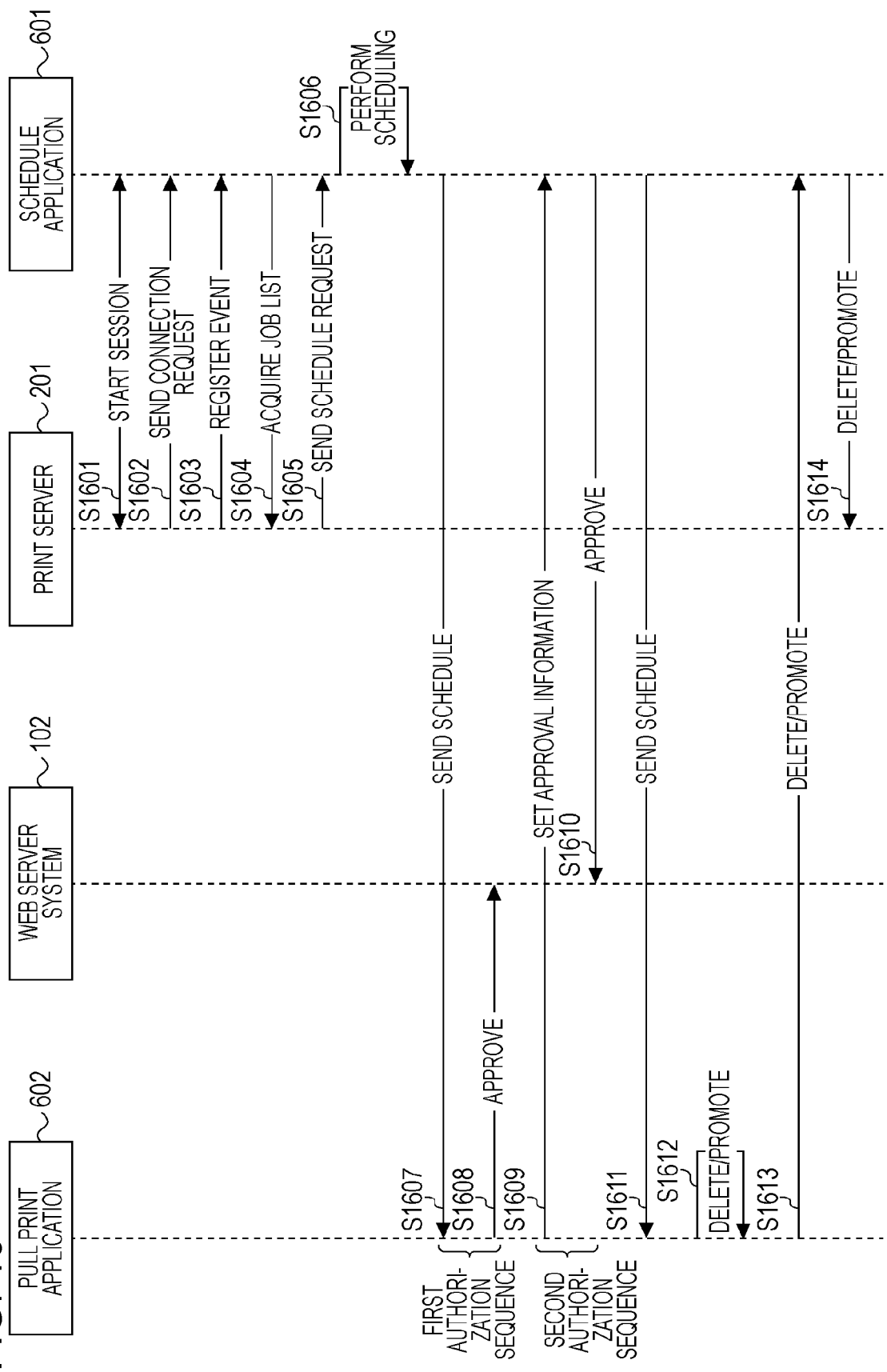
FIG. 19 is a diagram illustrating an example of a sequence performed when a promote button or a delete button is pressed on a print job screen according to an embodiment of the present invention.

Steps S1601 to S1606 in FIG. 19 are similar to steps S1001 to S1005 in the printing sequence performed between the print server 201 and the schedule application 601, described above with reference to FIG. 10. Steps S1606 to S1609 correspond to steps S1407 to S1410 in the authorization sequence described above with reference to FIG. 16. Steps S1610 and S1611 correspond to steps S1507 and S1508 in the authorization sequence described above with reference to FIG. 18.

In step S1612, if the promote button 1707 or the delete button 1708 on the print job screen 901 is operated by a user so as to be pressed, the pull print application 602 performs the following process. That is, depending on the pressed button, in step S1613 the pull print application 602 sends a print job promote request or a print job delete request to the schedule application 601. When the request is sent, a print job ID and information indicating the handling operation type such as promoting or deleting are sent together with the request.

If the schedule application 601 receives the promote request or the delete request, the schedule application 601 makes a determination as to the authority on the basis of the preset authorized authority information 807. If it is determined that the authority is granted, then in step S1614, the schedule application 601 requests the print server 201 to perform the promoting or the deleting. In the present embodiment, as described above, the determination unit is realized by executing the process in step S1612.

The determination as to the authority of deleting is made simply by checking whether the authority is granted or not. In contrast, the determination as to the authority of promoting is made, for example, as follows. That is, a determination is made as to whether a print job requested to be promoted is allowed to be advanced in schedule to a point prior to a print job currently scheduled to be printed before the print job requested to be promoted. In accordance with a result of the determination, the print job is promoted to an allowable earliest point in schedule. Alternatively, only when the print job has the authority to get ahead of all print jobs currently scheduled to be printed before the print job requested to be promoted, the print job may be promoted, but otherwise the print job may not be promoted (the promotion fails).

Thus, as described above, the pull print application 602 is capable of directly and efficiently requesting the schedule application 601 to perform a handling operation such as promoting or deleting on a print job.

In the present embodiment, as described above, a request for setting the "user authority" for a print job scheduled in the schedule information 800 is issued from the print device 106 to the Web server system 102. Upon receiving the request, the Web server system 102 performs the authorization as to the authority requested to be set, according to the preset policy. If the authority is authorized, the print device 106 sets the authorized authority information 807 indicating the authorized authority in the schedule information 800. Thereafter, if a command to perform an operation such as pull printing on the print job is issued on the print device 106, the print device 106 determines whether the authority for the operation is granted or not on the basis of the authorized authority information 807. If the result of the determination indicates that the authority is granted, the print device 106 performs the requested operation. Thus, the pull print system is capable of efficiently handling the print job according to the authority granted to the user.

Other Embodiments of the Invention

In the above-described embodiments of the present invention, the printing apparatus, the units included in the printing system, and steps of the method of controlling printing according to the above-described embodiments of the invention may be realized by executing a program stored in a RAM or a ROM on a computer. Note that the program and a computer-readable storage medium in which the program is stored fall within the scope of the present invention.

The present invention may be embodied, for example, in the form of a system, an apparatus, a method, a program, or a storage medium. More specifically, the present invention may be applied to a system including a plurality of apparatuses, devices, or the like, or may be applied to a single apparatus.

In the present invention, a software program for realizing a function of any embodiment described above (a program corresponding to any of the flow charts shown in FIGS. 10, 11, 13, 15, 16, 18, and 19) may be directly or remotely supplied to a system or an apparatus. The function of any embodiment of the present invention may be realized by a computer disposed in the system of the apparatus by reading and executing the supplied program code.

Thus, the program code installed on the computer to realize one or more functions according to any of the above-described embodiments of the invention on the computer also falls within the scope of the present invention. That is, the computer program for realizing one or more functions according to any of the above-described embodiments of the invention also falls within the scope of the present invention.

In this case, there is no particular restriction on the form of the program as long as it functions as a program. That is, the program may be realized in various forms such as an object code, a program executed by an interpreter, script data supplied to an operating system, etc.

Specific examples of storage media by which to supply the program include a floppy (registered trademark) disk, a hard disk, an optical disk, a magneto-optical disk, an MO disk, a CD-ROM disk, a CD-R disk, a CD-RW disk, etc. A magnetic tape, a non-volatile memory card, a ROM, a DVD (DVD-ROM, DVD-R) disk, or the like may also be used as the storage medium for the above-described purpose.

The program may also be supplied such that a client computer is connected to an Internet Web site via a browser, and an original computer program or a file including a compressed computer program and an automatic installer is downloaded into a storage medium such as a hard disk of the client computer thereby supplying the program.

The program code of the program according to an embodiment of the present invention may be divided into a plurality of files, and respective files may be downloaded from different Web sites. Thus, a WWW server that provides, to a plurality of users, a program file that realizes one or more functions according to any embodiment of the invention on a computer also falls within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer using the downloaded key information thereby achieving the one or more functions according to any embodiment of the present invention.

One or more functions according to any embodiment of the present invention may be realized by a computer by executing the program. Furthermore, one or more functions according to any embodiment of the present invention may be realized by an OS or the like running on a computer by executing part or all of a process.

A program may be read from a storage medium and loaded into a memory of a function extension board inserted in a computer or into a memory of a function extension unit connected to the computer, and a CPU or the like disposed in the function extension board or the function extension unit may perform part or all of the process according to the loaded program thereby achieving one or more functions according to any embodiment of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-197740 filed Jul. 30, 2007, which is hereby incorporated by reference herein in its entirety.

What is claimed is:

1. A printing apparatus configured to manage a schedule of a plurality of print jobs and to receive and perform a print job based on the schedule, comprising:
  a request unit configured to request an external server for authorization of a user, who has logged in to the printing apparatus for handling each print job of the schedule when the user logs into the printing apparatus, wherein the handling includes cancelling and promoting;
  an authority setting unit configured to, if the authority of the user for the print job is authorized, set for each content of the handling, in the schedule at the printing apparatus, the authority of the user for handling the each print job of the schedule, in accordance with the authorization;
  a determination unit configured to, if a command to handle the print job of the schedule is issued by the user, determine whether the user has the authority to perform the handling based on the authority set in the printing apparatus by the authority setting unit; and
  an execution unit configured to, if the determination unit determines that the user has the authority, execute a process according to the handling on the print job of the schedule before receiving the print job, wherein if the determination unit determines that the user does not have the authority, the execution unit does not execute the process according to the handling on the print job of the schedule,
  wherein the request unit is configured to request the external server for authorization of the user, who has logged in to the printing apparatus for handling each print job of the schedule, before the command to handle the print job of the schedule is issued by the user, and
  the authority setting unit is configured to, if the authority of the user for the print job is authorized, set for each content of the handling, in the schedule at the printing apparatus, the authority of the user for handling the each print job of the schedule in accordance with the authorization before the command to handle the print job of the schedule is issued by the user.

2. The printing apparatus according to claim 1, wherein the authority setting unit sets the authority of the user for handling the print job whose schedule has been registered in response to logging-in of the user to the printing apparatus.

3. The printing apparatus according to claim 1, wherein the authority setting unit sets the authority of the user for handling the print job when the authority of the user for the print job whose schedule has been registered is authorized based on information associated with the user who is logging in to the printing apparatus.

4. The printing apparatus according to claim 1, further comprising a deleting unit configured to delete, in the schedule at the printing apparatus, the authority, set by the authority setting unit, of the user for all print jobs in response to logging out of the user from the printing apparatus.

5. The printing apparatus according to claim 1, wherein the request unit requests the external server to authorize the authority of the user for all print jobs whose schedule has been registered.

6. The printing apparatus according to claim 5, wherein the request unit requests the external server to authorize the authority of the user for a print job of the schedule determined by comparing information set to the print job of the schedule with present information.

7. The printing apparatus according to claim 5, wherein the request unit requests the external server to authorize the authority of the user for a predetermined number of print jobs in the schedule registration order.

8. The printing apparatus according to claim 1, wherein
  the authority includes at least one of authority to delete the print job of the schedule or change the processing order assigned to the print job of the schedule or authority to access detailed information of the print job of the schedule; and
  if the determination unit determines that the user has the authority, the execution unit executes at least one of deleting of the print job of the schedule or changing the processing order assigned to the print job of the schedule or accessing to the detailed information of the print job of the schedule depending on the authority.

9. A printing system comprising the printing apparatus according to claim 1 and an apparatus configured to perform authorization as to authority of a user for a print job whose schedule is registered in the printing apparatus.

10. A method of managing a schedule of a plurality of print jobs and receiving and performing a print job based on the schedule, comprising the steps of:
  requesting an external server for authorization of a user, who has logged in to a printing apparatus for handling each print job of the schedule when the user logs into the printing apparatus, wherein the handling includes cancelling and promoting;
  if the authority of the user for the print job is authorized, setting for each content of the handling, in the schedule at the printing apparatus, the authority of the user for handling the each print job of the schedule, in accordance with the authorization;
  if a command to handle the print job of the schedule is issued by the user, determining whether the user has the authority to perform the handling, based on the authority set in the printing apparatus in the authority setting step; and
  if the determination in the determination step is that the user has the authority, executing a process according to the handling on the print job of the schedule before receiving the print job, wherein if the determination in the determination step is that the user does not have the authority, the process according to the handling on the print job of the schedule is not executed,
  wherein the requesting the external server for authorization of the user, who has logged in to the printing apparatus for handling each print job of the schedule, is performed before the command to handle the print job of the schedule is issued by the user, and
  if the authority of the user for the print job is authorized, the setting for each content of the handling, in the schedule at the printing apparatus, the authority of the user for handling the each print job of the schedule in accordance with the authorization is performed before the command to handle the print job of the schedule is issued by the user.

11. A non-transitory computer-readable storage medium storing a program configured to cause a computer to execute a process of managing a schedule of a plurality of print jobs and receiving and performing a print job based on the schedule, the process comprising the steps of:

requesting an external server for authorization of a user, who has logged in to a printing apparatus for handling each print job of the schedule when the user logs into the printing apparatus, wherein the handling includes cancelling and promoting;

if the authority of the user for the print job is authorized, setting for each content of the handling, in the schedule at the printing apparatus, the authority of the user for handling the each print job of the schedule, in accordance with the authorization;

if a command to handle the print job of the schedule is issued by the user, determining whether the user has the authority to perform the handling, based on the authority set in the printing apparatus in the authority setting step; and if the determination in the determination step is that the user has the authority, executing a process according to the handling on the print job of the schedule before receiving the print job, wherein if the determination in the determination step is that the user does not have the authority, the process according to the handling on the print job of the schedule is not executed, wherein the requesting the external server for authorization of the user, who has logged in to the printing apparatus for handling each print job of the schedule, is performed before the command to handle the print job of the schedule is issued by the user, and if the authority of the user for the print job is authorized, the setting for each content of the handling, in the schedule at the printing apparatus, the authority of the user for handling the each print job of the schedule in accordance with the authorization is performed before the command to handle the print job of the schedule is issued by the user.

* * * * *